(12) United States Patent
Moshfeghi

(10) Patent No.: US 9,829,560 B2
(45) Date of Patent: *Nov. 28, 2017

(54) DETERMINING THE POSITION OF A MOBILE DEVICE USING THE CHARACTERISTICS OF RECEIVED SIGNALS AND A REFERENCE DATABASE

(71) Applicant: Golba LLC, Rancho Palos Verdes, CA (US)

(72) Inventor: Mehran Moshfeghi, Rancho Palos Verdes, CA (US)

(73) Assignee: GOLBA LLC, Ranchos Palos Verdes, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/920,888

(22) Filed: Oct. 23, 2015

(65) Prior Publication Data

US 2016/0146922 A1    May 26, 2016

Related U.S. Application Data

(63) Continuation of application No. 13/678,484, filed on Nov. 15, 2012, now Pat. No. 9,173,187, which is a
(Continued)

(51) Int. Cl.
G01S 3/02    (2006.01)
G01S 5/02    (2010.01)
(Continued)

(52) U.S. Cl.
CPC .......... *G01S 5/0252* (2013.01); *G01S 5/0236* (2013.01); *H04W 4/027* (2013.01); *H04W 4/028* (2013.01);
(Continued)

(58) Field of Classification Search
CPC .................. G01S 5/04; G01S 5/0221
(Continued)

(56) References Cited

U.S. PATENT DOCUMENTS 3,303,501 A    2/1967    Mahoney
3,778,159 A    12/1973   Hines et al.
(Continued)

FOREIGN PATENT DOCUMENTS

JP    2006-0112822    4/2006
WO    WO 2005/091997    10/2005
(Continued)

OTHER PUBLICATIONS

U.S. Appl. No. 14/960,873, filed Dec. 7, 2015, Moshfeghi, Mehran.
(Continued)

*Primary Examiner* — Dao Phan
(74) *Attorney, Agent, or Firm* — Adeli LLP

(57) ABSTRACT

Some embodiments use scanning devices to characterize radio signals received at a number of locations within a geographical area of interest. The signal characteristics along with the location information associated with the characteristics are stored in a centralized reference database. A mobile device characterizes signals it receives at a certain location and compares the characteristics with the signal characteristics stored in the reference database to obtain accurate location information of the certain location.

30 Claims, 17 Drawing Sheets

Related U.S. Application Data continuation of application No. 12/852,443, filed on Aug. 6, 2010, now Pat. No. 8,314,736, which is a continuation-in-part of application No. 12/059,558, filed on Mar. 31, 2008, now Pat. No. 7,800,541, and a continuation-in-part of application No. 12/833,938, filed on Jul. 9, 2010, now Pat. No. 8,344,949.

(60) Provisional application No. 61/231,905, filed on Aug. 6, 2009.

(51) Int. Cl.
*H04W 64/00* (2009.01)
*H04W 4/02* (2009.01)

(52) U.S. Cl.
CPC ......... *H04W 64/00* (2013.01); *H04W 64/006* (2013.01); *G01S 5/0273* (2013.01)

(58) Field of Classification Search
USPC ........ 342/453, 457, 463–465; 455/65, 456.1, 455/456.2
See application file for complete search history.

(56) References Cited

U.S. PATENT DOCUMENTS

| | | |
|---|---|---|
| 4,283,726 A | 8/1981 | Spence et al. |
| 4,851,851 A | 7/1989 | Hane |
| 5,323,322 A | 6/1994 | Mueller et al. |
| 5,365,516 A | 11/1994 | Jandrell |
| 5,796,773 A | 8/1998 | Sheynblat |
| 5,874,914 A | 2/1999 | Krasner |
| 5,936,577 A | 8/1999 | Shoki et al. |
| 5,999,124 A | 12/1999 | Sheynblat |
| 6,131,067 A | 10/2000 | Girerd et al. |
| 6,185,427 B1 | 2/2001 | Krasner et al. |
| 6,204,765 B1 | 3/2001 | Brady et al. |
| 6,215,441 B1 | 4/2001 | Moeglein et al. |
| 6,295,019 B1 | 9/2001 | Richards et al. |
| 6,496,806 B1 | 12/2002 | Horwitz et al. |
| 6,577,238 B1 | 6/2003 | Whitesmith et al. |
| 6,657,586 B2 | 12/2003 | Turner |
| 6,659,344 B2 | 12/2003 | Otto et al. |
| 6,693,592 B2 | 2/2004 | Dowdle et al. |
| 6,700,533 B1 | 3/2004 | Werb et al. |
| 6,717,516 B2 | 4/2004 | Bridgelall |
| 6,718,159 B1 | 4/2004 | Sato |
| 6,731,908 B2 | 5/2004 | Berliner et al. |
| 6,750,769 B1 | 6/2004 | Smith |
| 6,802,035 B2 | 10/2004 | Catreux et al. |
| 6,859,761 B2 | 2/2005 | Bensky et al. |
| 6,868,073 B1 | 3/2005 | Carrender |
| 6,920,330 B2 | 7/2005 | Caronni et al. |
| 7,026,935 B2 | 4/2006 | Diorio et al. |
| 7,038,573 B2 | 5/2006 | Bann |
| 7,045,996 B2 | 5/2006 | Lyon et al. |
| 7,057,492 B2 | 6/2006 | Jackson et al. |
| 7,119,736 B2 | 10/2006 | Heide et al. |
| 7,119,738 B2 | 10/2006 | Bridgelall et al. |
| 7,161,470 B2 | 1/2007 | Berquist et al. |
| 7,187,949 B2 | 3/2007 | Chang et al. |
| 7,205,931 B2 | 4/2007 | Gila et al. |
| 7,228,228 B2 | 6/2007 | Bartlett et al. |
| 7,248,217 B2 | 7/2007 | Mani et al. |
| 7,260,141 B2 | 8/2007 | Bierly et al. |
| 7,548,153 B2 | 6/2009 | Gravelle et al. |
| 7,574,236 B1 | 8/2009 | Mansour |
| 7,580,378 B2 | 8/2009 | Carrender et al. |
| 7,636,573 B2 | 12/2009 | Walton et al. |
| 7,688,909 B2 | 3/2010 | Tsutsui |
| 7,710,319 B2 | 5/2010 | Nassiri-Toussi et al. |
| 7,755,541 B2 | 7/2010 | Wisherd et al. |
| 7,800,541 B2 | 9/2010 | Moshfeghi |
| 7,890,114 B2 | 2/2011 | Braun et al. |
| 7,904,117 B2 | 3/2011 | Doan et al. |
| 8,098,752 B2 | 1/2012 | Hwang et al. |
| 8,126,408 B2 | 2/2012 | Ahrony et al. |
| 8,140,122 B2 | 3/2012 | Park et al. |
| 8,160,601 B2 | 4/2012 | Veselinovic et al. |
| 8,193,978 B2 | 6/2012 | Moshfeghi |
| 8,203,978 B2 | 6/2012 | Walton et al. |
| 8,279,132 B2 | 10/2012 | Jung et al. |
| 8,280,445 B2 | 10/2012 | Yong et al. |
| 8,314,736 B2 | 11/2012 | Moshfeghi |
| 8,320,304 B2 | 11/2012 | Deb et al. |
| 8,344,949 B2 | 1/2013 | Moshfeghi |
| 8,364,188 B2 | 1/2013 | Srinivasan et al. |
| 8,369,791 B2 | 2/2013 | Hafeez |
| 8,385,452 B2 | 2/2013 | Gorokhov |
| 8,396,157 B2 | 3/2013 | Li et al. |
| 8,421,676 B2 | 4/2013 | Moshfeghi |
| 8,570,216 B2 | 10/2013 | Gutt et al. |
| 8,639,270 B2 | 1/2014 | Moshfeghi |
| 8,754,812 B2 | 6/2014 | Moshfeghi |
| 8,792,915 B2 | 7/2014 | Moshfeghi |
| 8,818,418 B2 | 8/2014 | Moshfeghi |
| 8,818,419 B2 | 8/2014 | Moshfeghi |
| 9,113,343 B2 | 8/2015 | Moshfeghi |
| 9,173,187 B2 | 10/2015 | Moshfeghi |
| 9,210,683 B2 | 12/2015 | Moshfeghi |
| 9,366,745 B2 | 6/2016 | Moshfeghi |
| 9,513,375 B2 | 12/2016 | Moshfeghi |
| 2003/0176196 A1 | 9/2003 | Hall et al. |
| 2004/0002305 A1 | 1/2004 | Byman-Kivivuori et al. |
| 2004/0008138 A1 | 1/2004 | Hockley, Jr. et al. |
| 2004/0077354 A1 | 4/2004 | Jason et al. |
| 2004/0116129 A1 | 6/2004 | Wilson |
| 2004/0166808 A1 | 8/2004 | Hasegawa et al. |
| 2004/0185873 A1 | 9/2004 | Gilkes et al. |
| 2004/0198381 A1 | 10/2004 | Siegel et al. |
| 2004/0218895 A1 | 11/2004 | Samadani et al. |
| 2004/0243588 A1 | 12/2004 | Tanner et al. |
| 2004/0260506 A1 | 12/2004 | Jones et al. |
| 2005/0030160 A1 | 2/2005 | Goren et al. |
| 2005/0036460 A1 | 2/2005 | Dougherty et al. |
| 2005/0048964 A1 | 3/2005 | Cohen et al. |
| 2005/0088284 A1 | 4/2005 | Zai et al. |
| 2005/0124355 A1 | 6/2005 | Cromer et al. |
| 2005/0129139 A1 | 6/2005 | Jones et al. |
| 2005/0136943 A1 | 6/2005 | Banerjee et al. |
| 2005/0198228 A1 | 9/2005 | Bajwa et al. |
| 2005/0232216 A1 | 10/2005 | Webster et al. |
| 2005/0237953 A1 | 10/2005 | Carrender et al. |
| 2005/0242188 A1 | 11/2005 | Vesuna |
| 2005/0243756 A1 | 11/2005 | Cleveland et al. |
| 2005/0245235 A1 | 11/2005 | Vesuna |
| 2005/0281363 A1 | 12/2005 | Qi et al. |
| 2006/0012465 A1 | 1/2006 | Lee et al. |
| 2006/0063494 A1 | 3/2006 | Zhang et al. |
| 2006/0068750 A1 | 3/2006 | Burr |
| 2006/0114104 A1 | 6/2006 | Scaramozzino |
| 2006/0170565 A1 | 8/2006 | Husak et al. |
| 2006/0170591 A1 | 8/2006 | Houri |
| 2006/0197652 A1 | 9/2006 | Hild et al. |
| 2006/0217131 A1 | 9/2006 | Alizadeh-Shabdiz et al. |
| 2006/0267731 A1 | 11/2006 | Chen |
| 2007/0045424 A1 | 3/2007 | Wang |
| 2007/0046467 A1 | 3/2007 | Chakraborty et al. |
| 2007/0075838 A1 | 4/2007 | Powell |
| 2007/0093270 A1 | 4/2007 | Lagnado |
| 2007/0099627 A1 | 5/2007 | Kofol et al. |
| 2007/0103303 A1 | 5/2007 | Shoarinejad |
| 2007/0116012 A1 | 5/2007 | Chang et al. |
| 2007/0216540 A1 | 9/2007 | Riley et al. |
| 2007/0242647 A1 | 10/2007 | Bennett |
| 2007/0252758 A1 | 11/2007 | Loomis |
| 2007/0258421 A1 | 11/2007 | Alizadeh-Shabdiz et al. |
| 2007/0279281 A1 | 12/2007 | Oda et al. |
| 2008/0008109 A1 | 1/2008 | Ollis |
| 2008/0045236 A1 | 2/2008 | Nahon et al. |
| 2008/0088452 A1 | 4/2008 | Agrawal et al. |
| 2008/0103371 A1 | 5/2008 | Alizadeh-Shabdiz et al. |
| 2008/0143482 A1 | 6/2008 | Shoarinejad et al. |

(56) References Cited

U.S. PATENT DOCUMENTS

| | | | |
|---|---|---|---|
| 2008/0143584 | A1 | 6/2008 | Shoarinejad et al. |
| 2008/0167049 | A1 | 7/2008 | Karr et al. |
| 2008/0212582 | A1 | 9/2008 | Zwart et al. |
| 2008/0261509 | A1 | 10/2008 | Sen |
| 2008/0278328 | A1 | 11/2008 | Chand et al. |
| 2008/0284646 | A1 | 11/2008 | Walley et al. |
| 2008/0318579 | A1 | 12/2008 | McCoy et al. |
| 2009/0033462 | A1 | 2/2009 | Kitayoshi et al. |
| 2009/0042614 | A1 | 2/2009 | Karaoguz et al. |
| 2009/0093265 | A1 | 4/2009 | Kimura et al. |
| 2009/0156227 | A1 | 6/2009 | Frerking et al. |
| 2010/0080197 | A1 | 4/2010 | Kanellakis et al. |
| 2010/0090898 | A1 | 4/2010 | Gallagher et al. |
| 2010/0105403 | A1 | 4/2010 | Lennartson et al. |
| 2010/0117890 | A1 | 5/2010 | Vook et al. |
| 2010/0136922 | A1 | 6/2010 | Rofougaran |
| 2010/0172309 | A1 | 7/2010 | Forenza et al. |
| 2010/0173663 | A1 | 7/2010 | Umeda |
| 2010/0220012 | A1 | 9/2010 | Reede |
| 2010/0222081 | A1 | 9/2010 | Ward et al. |
| 2010/0273504 | A1 | 10/2010 | Bull et al. |
| 2010/0298015 | A1 | 11/2010 | Medbo et al. |
| 2010/0304770 | A1 | 12/2010 | Wietfeldt et al. |
| 2010/0311456 | A1 | 12/2010 | Inoue et al. |
| 2011/0003610 | A1 | 1/2011 | Key et al. |
| 2011/0105167 | A1 | 5/2011 | Pan et al. |
| 2011/0194504 | A1 | 8/2011 | Gorokhov et al. |
| 2011/0212684 | A1 | 9/2011 | Nam et al. |
| 2011/0299441 | A1 | 12/2011 | Petrovic |
| 2012/0082070 | A1 | 4/2012 | Hart et al. |
| 2012/0129543 | A1 | 5/2012 | Patel et al. |
| 2012/0149300 | A1 | 6/2012 | Forster |
| 2012/0184203 | A1 | 7/2012 | Tulino et al. |
| 2012/0194385 | A1 | 8/2012 | Schmidt et al. |
| 2012/0238202 | A1 | 9/2012 | Kim et al. |
| 2012/0280859 | A1 | 11/2012 | Moshfeghi |
| 2013/0040558 | A1 | 2/2013 | Kazmi |
| 2013/0044028 | A1 | 2/2013 | Lea et al. |
| 2015/0006073 | A1 | 1/2015 | Moshfeghi |
| 2015/0234051 | A1 | 8/2015 | Moshfeghi |
| 2016/0011673 | A1 | 1/2016 | Moshfeghi |
| 2016/0165400 | A1 | 6/2016 | Moshfeghi |
| 2016/0327632 | A1 | 11/2016 | Moshfeghi |

FOREIGN PATENT DOCUMENTS

| | | |
|---|---|---|
| WO | WO 2007/056333 | 5/2007 |
| WO | WO 2009/124071 | 10/2009 |

OTHER PUBLICATIONS

Portions of prosecution history of U.S. Appl. No. 14/056,864 dated Jul. 14, 2014, Moshfeghi, Mehran.
Portions of prosecution history of U.S. Appl. No. 14/056,869 dated Jul. 18, 2014, Moshfeghi, Mehran.
Portions of prosecution history of U.S. Appl. No. 12/059,558 dated Aug. 20, 2010, Moshfeghi, Mehran.
Portions of prosecution history of U.S. Appl. No. 12/833,938 dated Nov. 28, 2012, Moshfeghi, Mehran.
Portions of prosecution history of U.S. Appl. No. 12/843,868 dated Mar. 14, 2013, Moshfeghi, Mehran.
Portions of prosecution history of U.S. Appl. No. 12/852,443 dated Oct. 9, 2012, Moshfeghi, Mehran.
Portions of prosecution history of U.S. Appl. No. 13/435,151 dated Sep. 19, 2013, Moshfeghi, Mehran.
Portions of prosecution history of U.S. Appl. No. 13/471,369 dated Nov. 28, 2014, Moshfeghi, Mehran.
Portions of prosecution history of U.S. Appl. No. 13/678,484 dated Sep. 30, 2015, Moshfeghi, Mehran.
Portions of prosecution history of U.S. Appl. No. 13/730,083 dated Jul. 17, 2015, Moshfeghi, Mehran.
Portions of prosecution history of U.S. Appl. No. 13/859,682 dated May 15, 2014, Moshfeghi, Mehran.
Portions of prosecution history of U.S. Appl. No. 14/056,858 dated Jun. 30, 2014, Moshfeghi, Mehran.
Portions of prosecution history of U.S. Appl. No. 14/302,378 dated Jan. 29, 2016, Moshfeghi, Mehran.
Portions of prosecution history of U.S. Appl. No. 14/455,861 dated Aug. 5, 2015, Moshfeghi, Mehran.
Portions of prosecution history of U.S. Appl. No. 14/698,722 dated Mar. 30, 2016, Moshfeghi, Mehran.
Portions of prosecution history of U.S. Appl. No. 14/798,359, dated Feb. 3, 2016, Moshfeghi, Mehran.
Portions of prosecution history of U.S. Appl. No. 11/940,219 dated Apr. 17, 2012, Moshfeghi, Mehran.
International Search Report and Written Opinion of PCT/US2009/038992 dated May 20, 2009, Moshfeghi, Mehran.
Interational Preliminary Report on Patentability of PCT/US2009/038992 dated Oct. 5, 2010, Moshfeghi, Mehran.
Author Unknown "Four Challenges", Month Unknown, 2004, pp. 1-7.
Author Unknown, "Cisco Application-Oriented Networking Facilitates Intelligent Radio Frequency Identification Processing at the Edge", Month Unknown, 2005, pp. 1-9.
Author Unknown, "ConnecTerra Product Family", www.connecterra.com, Month Unknown, 2005, pp. 1-2.
Author Unknown, "Delivering An Intelligent Foundation for RFID: Maximizing Network Efficiency With Cisco RFID Solutions", Month Unknown, 2005, pp. 1-6.
Author Unknown, "Establishing the Foundation for Enterprise-Scale RFID Deployments", www.connecterra.com/products/rftagaware.php, Sep. 2005, pp. 1-2.
Author Unknown, "Installation Manual R500HA Long Range RFID Reader", www.iautomate.com, Month Unknown, 2005, pp. 1-40.
Author Unknown, "Issues on range and accuracy of RFID-radar™ system", RFID-rader accuracy report, Feb. 2006, pp. 1-4.
Author Unknown, "OFDM for Mobile Data Communications," International Engineering Consortium, Month Unknown, 2007, pp. 1-24.
Author Unknown, "The Sun Global RFID Network Vision: Connecting Businesses at the Edge of the Network", A Technical White Paper, Jul. 2004, pp. 1-20.
Author Unknown, RFTag Aware™ Enterprise Server, Centralized EPC Data Management and Reporting for Enterprise-Scale RFID Deployments, www.connecterra.com, Month Unknown, 2005, pp. 1-2.
Bahl, Paramvir, et al., "RADAR: An In-Building RF Based User Location and Tracking System", in Proceedings of IEEE Infocom, Mar. 2000, pp. 775-784, vol. 2.
Chon, Hae Don, et al., "Using RFID for Accurate Positioning", Journal of Global Positioning Systems, Feb. 3, 2005, pp. 32-39, vol. 3, No. 1-2.
Clark, Sean, et al., "Auto-ID Savant Specification 1.0", Month Unknown, 2003, pp. 1-58.
Gustafsson, Fredrik, et al., "Mobile Positioning Using Wireless Networks" IEEE Signal Processing Magazine, Jul. 2005, pp. 41-53.
Harter, Andy, et al., "A Distributed Location System for the Active Office", IEEE Network, Jan. 1994, pp. 1-17, vol. 8, No. 1.
Kim, Donghyun, et al., "GPS Ambiguity Resolution and Validation: Methodologies, Trends, and Issues," $7^{th}$ GNSS Workshop—International Symposium on GPS/GNSS, Nov. 30-Dec. 2, 2000, pp. 1-9, Seoul, Korea.
Kulyukin, Vladimir et al., "RFID in Robot Assisted Indoor Navigation for the Visually Impaired", Research Paper, Utah State University, Feb. 2004, pp. 1-6.
Lamarca, Anthony, et al., "Place Lab: Device Positioning Using Radio Beacons in the Wild." in Pervasive Computing, Month Unknown, 2005, pp. 116-133.
Maes, Pattie, et al., "Unveiling the "Sixth Sense," Game Changing Wearable Tech." TED 2009, Long Beach, CA USA, Month Unknown, 2009, pp. 1-2, http://www.ted.com/index.php/talks/pattie_maes_demos_the_sixth_sense.html the source video / home page (A1, A2) for the Video Clip.
Miller, Leonard E., "Why UWB? A Review of Ultra wideband Technology" National Institute of Standards and Technology, DARPA, Apr. 2003, pp. 1-72, Gaithersburg, Maryland.

(56) References Cited

OTHER PUBLICATIONS

Miller, Leonard E., "Wireless Technologies and the SAFECOM SoR for Public Safety Communications", National Institute of Standards and Technology, Month Unknown, 2005, pp. 1-68, Gaithersburg, Maryland.

Muthukrishnan, Kavitha, et al., "Towards Smart Surroundings: Enabling Techniques and Technologies for Localization." In: 1st Int. Workshop on Location—and Context-Awareness (LoCA), May 2005, pp. 350-362, University of Twente, the Netherlands.

Okabe, Masanobu, et al., "A Car Navigation System Utilizing a GPS Receiver", 1993 IEEE, Mar. 1993, pp. 278-279.

Patwari, Neal, et al., "Locating the Nodes" IEEE Signal Processing Magazine, Jul. 2005, pp. 54-69.

Philipose, Matthai, et al., "Mapping and Localization with RFID Technology", Intel Research White Paper, Dec. 2003, pp. 1-7.

Reynolds, Matthew, et al., "Design Considerations for embedded software-defined RFID Readers", Emerging Wireless Technology/ A Supplement to RF Design, Aug. 2005, pp. 14-15.

Sayed, Ali H., et al., "Network-Based Wireless Location", IEEE Signal Processing Magazine, Jul. 2005, pp. 24-40.

Sebum Chun, et al., "Performance Analysis of GPS Integer Ambiguity Resolution Using External Aiding Information," Journal of Global Positioning Systems, Month Unknown, 2005, pp. 201-206 vol. 4, No. 1-2.

Sun, Guolin, et al., "Signal Processing Techniques in Network-Aided Positioning", IEEE Signal Processing Magazine, Jul. 2005, pp. 12-23.

Turin, G., et al., "Simulation of Urban Vehicle-Monitoring Systems", IEEE Transactions on Vehicular Technology, Feb. 1972, pp. 9-16, vol. VT-21, No. 1.

Want, Roy, et al., "The Active Badge Location System", ACM Trans. Inf. Syst., 10(1): Month Unknown, 1992, pp. 91-102.

Updated portions of prosecution history of U.S. Appl. No. 13/471,369 dated Jul. 15, 2015, Moshfeghi, Mehran.

Updated portions of prosecution history of U.S. Appl. No. 14/698,722 dated Aug. 3, 2016, Moshfeghi, Mehran.

Updated portions of prosecution history of U.S. Appl. No. 14/302,378 dated May 17, 2016, Moshfeghi, Mehran.

Updated portions of prosecution history of U.S. Appl. No. 14/798,359 dated Sep. 16, 2016, Moshfeghi, Mehran.

Portions of prosecution history of U.S. Appl. No. 15/152,503 dated Jul. 27, 2016, Moshfeghi, Mehran.

Portions of prosecution history of U.S. Appl. No. 14/960,873 dated May 22, 2016, Moshfeghi, Mehran.

| Scanning Vehicle Position | MAC ID | Channel FFT Coefficient 1 (Real) | Channel FFT Coefficient 1 (Imaginary) | ... | Channel FFT Coefficient 64 (Real) | Channel FFT Coefficient 64 (Imaginary) |
|---|---|---|---|---|---|---|
| $(x_0,y_0,z_0)$ | $ID_1$ | $R_{1,1}(x_0,y_0,z_0)$ | $I_{1,1}(x_0,y_0,z_0)$ | ... | $R_{1,64}(x_0,y_0,z_0)$ | $S_{1,64}(x_0,y_0,z_0)$ |
| $(x_0,y_0,z_0)$ | $ID_2$ | $R_{2,1}(x_0,y_0,z_0)$ | $I_{2,1}(x_0,y_0,z_0)$ | ... | $R_{2,64}(x_0,y_0,z_0)$ | $S_{2,64}(x_0,y_0,z_0)$ |
| ... | ... | ... | ... | ... | ... | ... |
| $(x_n,y_n,z_n)$ | $ID_4$ | $R_{4,1}(x_n,y_n,z_n)$ | $I_{4,1}(x_n,y_n,z_n)$ | ... | $R_{4,64}(x_n,y_n,z_n)$ | $S_{4,64}(x_n,y_n,z_n)$ |
| $(x_n,y_n,z_n)$ | $ID_5$ | $R_{5,1}(x_n,y_n,z_n)$ | $I_{5,1}(x_n,y_n,z_n)$ | ... | $R_{5,64}(x_n,y_n,z_n)$ | $S_{5,64}(x_n,y_n,z_n)$ |
| $(x_n,y_n,z_n)$ | $ID_6$ | $R_{6,1}(x_n,y_n,z_n)$ | $I_{6,1}(x_n,y_n,z_n)$ | ... | $R_{6,64}(x_n,y_n,z_n)$ | $S_{6,64}(x_n,y_n,z_n)$ |

| Scanning Vehicle Position | MAC ID | Peak Index Number | Peak Amplitude | Peak Phase | Peak Time of Arrival Delay |
|---|---|---|---|---|---|
| $(x_0,y_0,z_0)$ | $ID_1$ | 1 | $A_{11}(x_0,y_0,z_0)$ | $\Phi_{11}(x_0,y_0,z_0)$ | $T_{11}(x_0,y_0,z_0)$ |
| $(x_0,y_0,z_0)$ | $ID_1$ | 2 | $A_{12}(x_0,y_0,z_0)$ | $\Phi_{12}(x_0,y_0,z_0)$ | $T_{12}(x_0,y_0,z_0)$ |
| $(x_0,y_0,z_0)$ | $ID_1$ | 3 | $A_{13}(x_0,y_0,z_0)$ | $\Phi_{13}(x_0,y_0,z_0)$ | $T_{13}(x_0,y_0,z_0)$ |
| $(x_0,y_0,z_0)$ | $ID_2$ | 1 | $A_{21}(x_0,y_0,z_0)$ | $\Phi_{21}(x_0,y_0,z_0)$ | $T_{21}(x_0,y_0,z_0)$ |
| ... | ... | ... | ... | ... | ... |
| $(x_n,y_n,z_n)$ | $ID_4$ | 1 | $A_{41}(x_n,y_n,z_n)$ | $\Phi_{41}(x_n,y_n,z_n)$ | $T_{41}(x_n,y_n,z_n)$ |
| $(x_n,y_n,z_n)$ | $ID_5$ | 1 | $A_{51}(x_n,y_n,z_n)$ | $\Phi_{51}(x_n,y_n,z_n)$ | $T_{51}(x_n,y_n,z_n)$ |
| $(x_n,y_n,z_n)$ | $ID_6$ | 1 | $A_{61}(x_n,y_n,z_n)$ | $\Phi_{61}(x_n,y_n,z_n)$ | $T_{61}(x_n,y_n,z_n)$ |
| $(x_n,y_n,z_n)$ | $ID_6$ | 2 | $A_{62}(x_n,y_n,z_n)$ | $\Phi_{62}(x_n,y_n,z_n)$ | $T_{62}(x_n,y_n,z_n)$ |

*Figure 6*

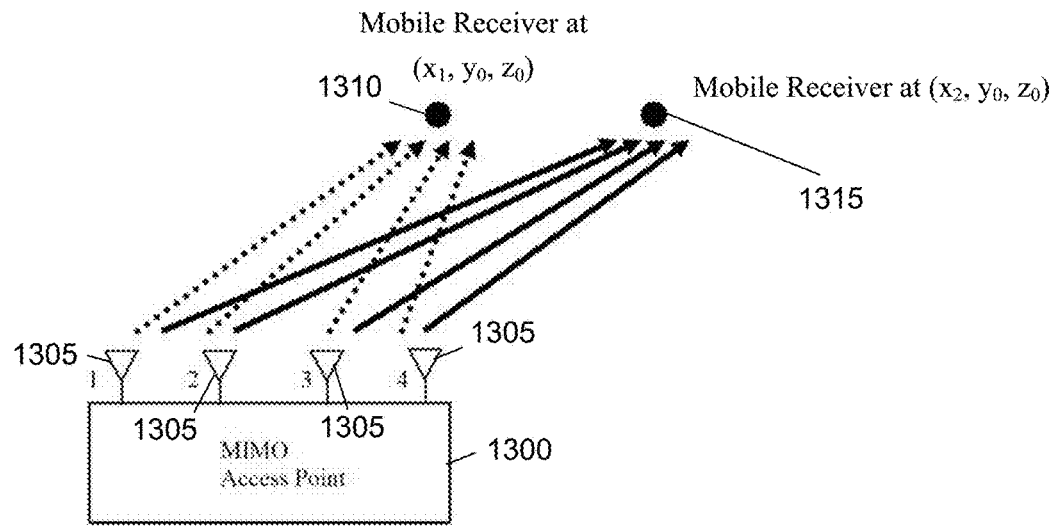
Figure 13
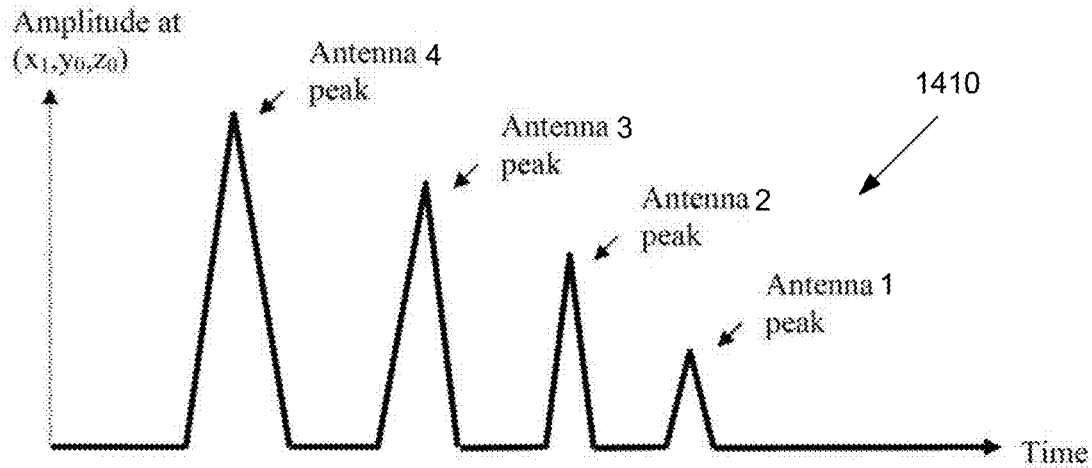
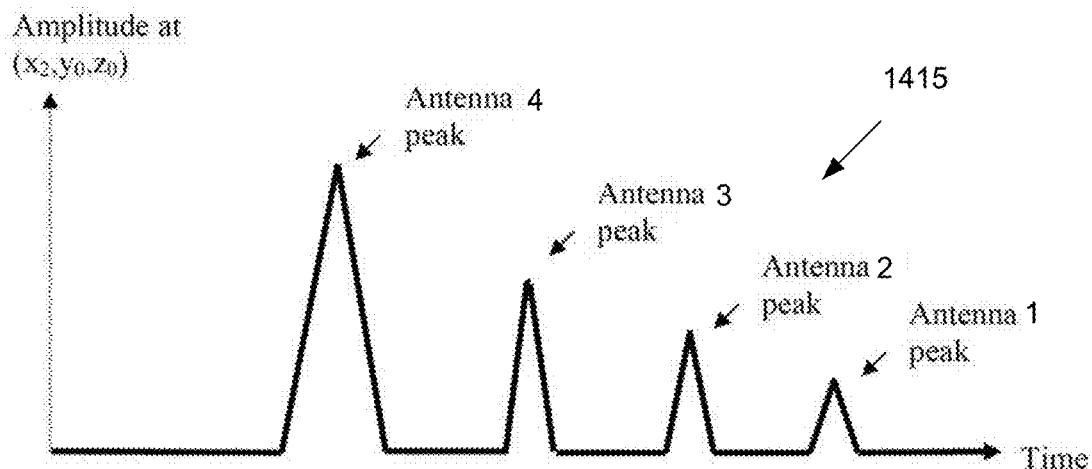
Figure 14

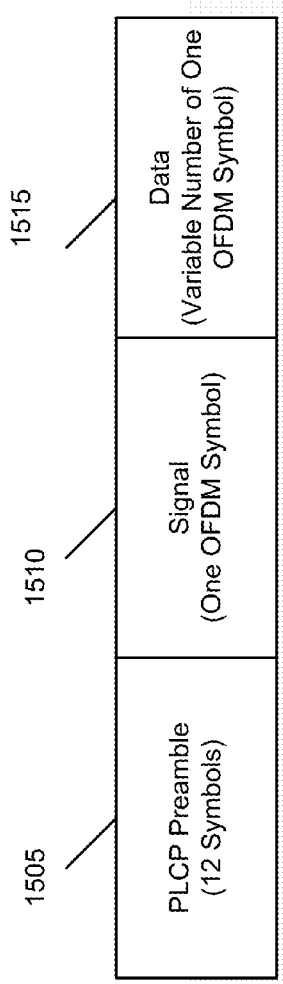
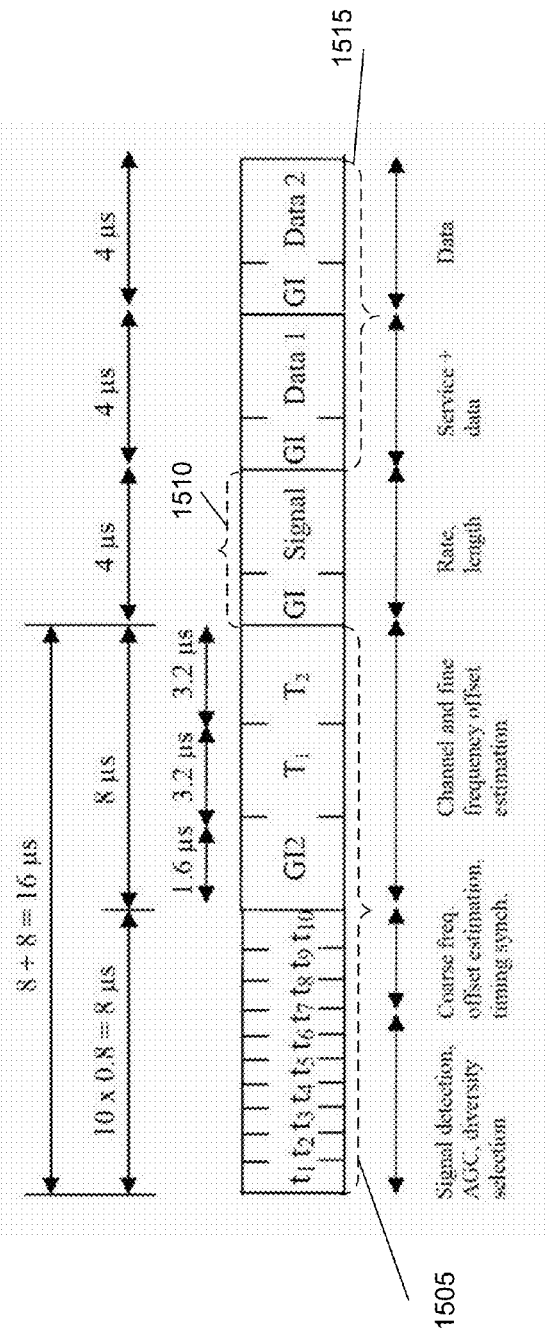

DETERMINING THE POSITION OF A MOBILE DEVICE USING THE CHARACTERISTICS OF RECEIVED SIGNALS AND A REFERENCE DATABASE

CLAIM OF BENEFIT TO PRIOR APPLICATIONS

The present Application is a continuation of and claims the benefit of U.S. patent application Ser. No. 13/678,484, published as U.S. Patent Publication 2013/0143595, entitled, "Determining the Position of a Mobile Device using the Characteristics of Received Signals and a Reference Database," filed Nov. 15, 2012. U.S. patent application Ser. No. 13/678,484 is a continuation of and claims the benefit of U.S. patent application Ser. No. 12/852,443, issued as U.S. Pat. No. 8,314,736, entitled, "Determining the Position of a Mobile Device using the Characteristics of Received Signals and a Reference Database," filed Aug. 6, 2010. U.S. patent application Ser. No. 12/852,443 is a continuation-in-part of and claims the benefit of U.S. patent application Ser. No. 12/059,558, entitled, "Methods and Systems for Determining the Location of an Electronic Device," filed Mar. 31, 2008, issued as U.S. Pat. No. 7,800,541. U.S. patent application Ser. No. 12/852,443 is also a continuation-in-part of and claims the benefit of U.S. patent application Ser. No. 12/833,938, entitled, "Wireless Positioning Approach Using Time-Delay of Signals with a Known Transmission Pattern," filed Jul. 9, 2010, issued as U.S. Pat. No. 8,344,949. U.S. patent application Ser. No. 12/852,443 also claims the benefit of U.S. Provisional Patent Application 61/231,905, entitled, "Method and System for Determining the Position of a Mobile Station," filed Aug. 6, 2009. The contents of U.S. patent application Ser. No. 13/678,484, published as U.S. Patent Publication 2013/0143595, U.S. patent application Ser. No. 12/852,443, issued as U.S. Pat. No. 8,314,736, U.S. patent application Ser. No. 12/059,558, issued as U.S. Pat. No. 7,800,541, U.S. patent application Ser. No. 12/833,938, issued as U.S. Pat. No. 8,344,949, and U.S. Provisional Application 61/231,905 are hereby incorporated by reference.

BACKGROUND

With proliferation of mobile devices such as smart phones, netbooks and tablet computers, there is a growing desire to obtain accurate location information of such devices because the information is of much use. Wireless positioning involves obtaining wireless signals and processing the signals into a location estimate. Typical information used for positioning includes Global Positioning System (GPS) signals, Received Signal Strength Indicator (RSSI), Angle of Arrival (AOA), Time of Arrival (TOA), Time Difference of Arrival (TDOA), and Doppler shift. This information is often processed to find the position of a wireless device. For example, triangulation is used where multiple range or angle measurements from known positions are used to calculate the position of a device.

One of the sources of errors in wireless positioning is multipath propagation. Multipath propagation occurs when a signal takes different paths when propagating from a source to a destination receiver. While the signal is traveling, objects get in the way and cause the signal to bounce in different directions before getting to the receiver. As a result, some of the signal will be delayed and travel longer paths to the receiver. In other instances there is no direct line of sight because an object is completely blocking and any received signals occur only due to multipath propagation. These effects cause errors in GPS data, RSSI, AOA, TOA, TDOA and Doppler shift. The computed position of the device using common techniques such as triangulation will therefore be incorrect.

Location-aware technologies compute the location of an object. These systems differ in terms of accuracy, coverage, cost of installation, and maintenance. GPS systems use satellite signals and work in outdoor environments. GPS systems, however, require direct line of sight and do not work in an indoor environment. Cell tower triangulation is another method that uses signals from cellular towers to locate a wireless user. This method is also limited in accuracy and reliability because of the coarse number of cell towers from a particular service provider that a mobile user can communicate with, as well as multipath issues.

Systems have been developed in the past that use the strength of wireless access point beacon signals in an outdoor environment to calculate the position of a mobile user. One technique is to create a database of wireless beacons and use that information together with the amplitude of beacons signals received by a mobile device to compute the location of the mobile device. Other techniques use radio frequency (RF) wireless signal strength information and triangulation to locate objects in an indoor environment. However, these methods provide poor indoor positioning accuracy because RF signal amplitude is greatly affected by metal objects, reflective surfaces, multipath, dead-spots, noise and interference.

BRIEF SUMMARY

Some embodiments of the invention employ radio wave signals to calculate the position of a wireless device in both indoor and outdoor environments. Initially a moving scanner (such as a vehicle equipped with radios) scans a geographical area of interest and receives radio waves from different sources that transmit radio waves in different standards such as GPS, Wireless Local Area Network (WLAN) 802.11, cellular (second generation (2G), third generation (3G), fourth generation (4G), etc.), Bluetooth®, Worldwide Interoperability for Microwave Access (WiMAX), HD Radio™, Ultra-wideband (UWB) and 60 GHz standards. The received signals are processed in order to characterize them and the transmission channels at each position of the vehicle.

The position of the vehicle, identifiers of the sources of the signals, and characterizations of the received signals and the transmission channel are stored locally and then transferred to a networked database in some embodiments. The information in the networked database then serves as reference information for locating wireless devices.

In locating a wireless device, the device initially receives wireless signals. These signals are then characterized and compared to the reference database. Interpolation is then used in some embodiments to find the position of the wireless device.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 6 illustrates an exemplary channel characteristics table of some embodiments.

FIG. 13 conceptually illustrates Multiple Input Multiple Output systems of some embodiments.

FIG. 14 conceptually illustrates amplitude of a multichannel profile of some embodiments.

FIG. 15 illustrates the frame format in the 802.11a standard.

FIG. 16 illustrates the OFDM training structure in detail.

DETAILED DESCRIPTION

Figure 1:
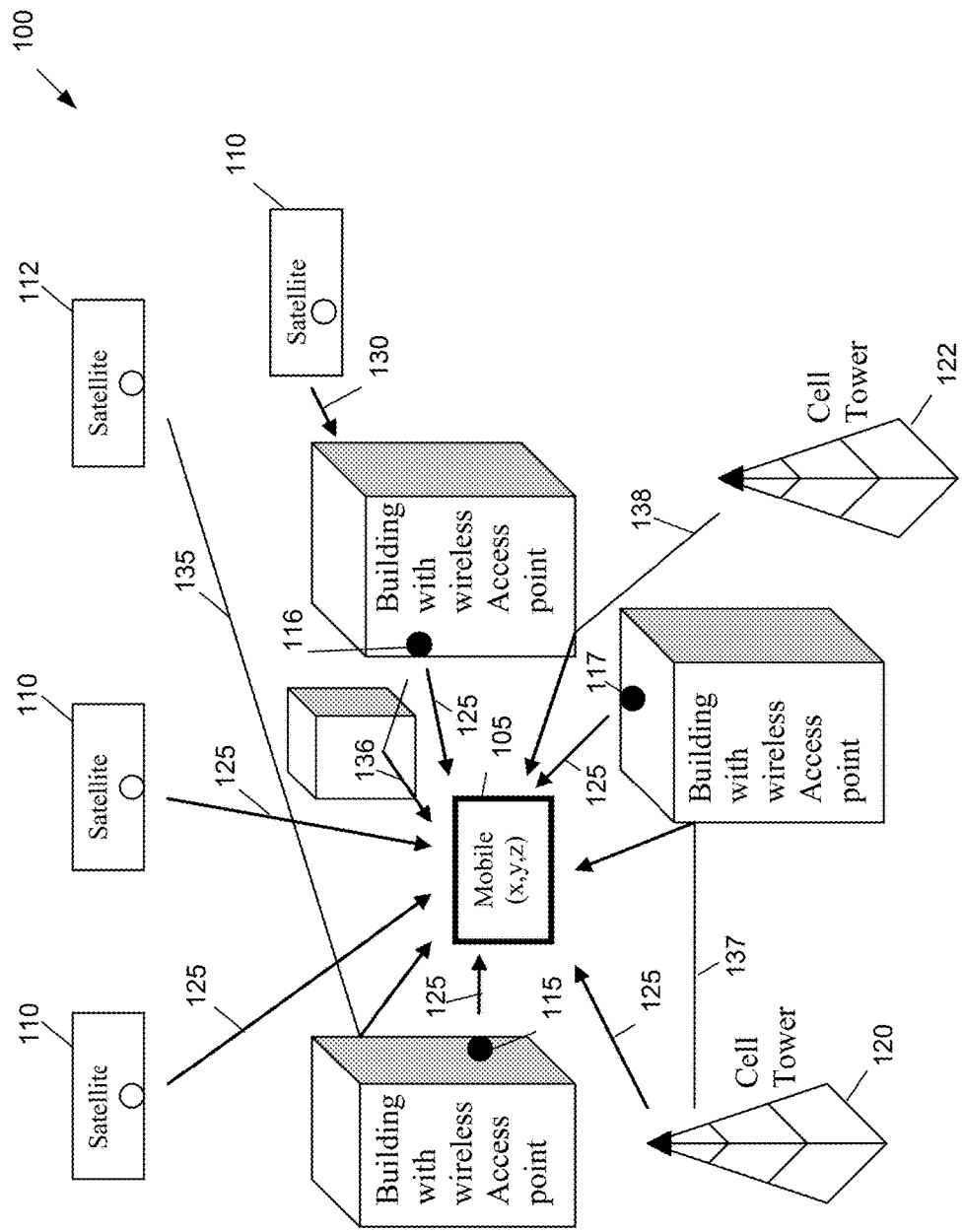
FIG. 1 conceptually illustrates a mobile device in an environment with multiple wireless networks.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention use wireless positioning methods that can work in both outdoor and indoor environments and can handle multipath propagation and indirect line of sight. Some of the methods do not use triangulation so that positioning calculation is not affected by errors caused by multipath propagation. These methods use measured channel characteristics which take multipath propagation into account, thereby overcoming the limitations of the existing technologies and systems. These methods also use existing wireless infrastructure and standards, thereby making the approach taken by these methods low-cost.

Some embodiments of the invention employ radio wave signals to calculate the position of a wireless device in both indoor and outdoor environments. Initially a moving scanner equipped with radios scans a geographical area of interest and receives radio waves from different sources that transmit radio waves in different standards such as GPS, WLAN 802.11, cellular (2G, 3G, 4G), Bluetooth®, WiMAX, HD Radio™, UWB, and 60 GHz standards. A moving scanner is a moving object that is equipped with one or more radios and can move about a geographical area of interest. For example, a moving scanner in some embodiments is a vehicle (e.g., a regular passenger car or a commercial truck) equipped with radios to receive signals and can move to locations within the geographical area of interest. In indoor environment, a moving scanner can be a small vehicle or a push-cart equipped with one or more radios. A moving scanner can also be a mobile device that is equipped with radio to receive radio signals at different locations to which the mobile device is carried by a user using the device. One of ordinary skill in the art would realize that other moving objects equipped with radios can be used without deviating from the teachings of the invention.

The received signals are processed in order to characterize them and the transmission channels at each position of the moving object. The position of the moving object, identifiers of the sources of the signals, and characterizations of the received signals and the transmission channel are stored locally and then transferred to a networked database in some embodiments. The information in the networked database then serves as reference information for locating wireless devices. In locating a wireless device, the device initially receives wireless signals. These signals are then characterized and compared to the reference database. Interpolation or extrapolation is then used in some embodiments to find the position of the wireless device.

A system that employs a known Radio Frequency (RF) transmission pattern to locate a receiver object is described in the above mentioned U.S. patent application Ser. No. 12/833,938. As the signal travels between a transmitter and a receiver, the system calculates the time delay between the two. By repeating this process with different transmitters with known coordinates, it is possible to process the time delay information and calculate the unknown position coordinates of the receiver.

A system that employs multi-tone Orthogonal Frequency-Division Multiplexing (OFDM) signals for locating an object is described in the above mentioned U.S. Patent Publication 2009-0243932. As an OFDM signal travels between a transmitter and a receiver, the system calculates the residual phase difference between pilot tone frequency pairs. By repeating this process with different OFDM transmitters (or receivers) with known coordinates, it is possible to process the residual phase differences to calculate the unknown position coordinates of an OFDM transmitter (or receiver).

In U.S. patent application Ser. No. 11/940,219 entitled, "Systems and Methods of Assisted GPS," filed Nov. 14, 2007, and published as U.S. Patent Publication 2009/0121927, it is described that wireless access points send differential assistance data to GPS receivers that are integrated into cellular chipsets and other chipsets. Errors caused by multipath travel of the GPS signals are reduced by using differential assistance data generated by reference access point receivers with fixed locations. U.S. Patent Publication 2009/0121927 is incorporated herein by reference.

A method to find the location of a Radio-Frequency Identification (RFID) tag from RF communication with one or more RFID readers at various positions is described in U.S. patent application Ser. No. 11/641,624, entitled "RFID Location Systems and Methods." filed Dec. 18, 2006, and published as U.S. Publication No. 2008-0143482 A1. A method of using the phase information of OFDM signals to locate a mobile device is described in the above mentioned U.S. Patent Publication 2009-0243932. How signals with a known Radio Frequency (RF) transmission pattern traveling between transmitters and a mobile receiver can be used to measure time of arrival information and processed using multi-lateration to locate the mobile receiver is described in the above mentioned U.S. patent application Ser. No. 12/833,938.

Some embodiments of the invention measure the characteristics of the channel at various locations and store them in a database, thereby providing a robust method of handling multipath propagation. The channel characteristics measure the behavior of the channel in that environment. The channel can include direct paths and/or indirect paths. In some embodiments, a wireless mobile device that needs to calculate its position characterizes the channels it experiences and compares them to the characterization data stored in the database. The wireless device experiences the same channel multipath behavior as the multipath behavior measured at the same (or a nearby) position/location and stored in the database. Some embodiments update the database for changes in the environment such as the location of obstacles, objects or buildings.

This approach is applicable to indoor and outdoor environments, and uses existing wireless infrastructure and handsets, thereby making the approach low-cost and available at a wide variety of locations. The method is complementary to GPS since it works in indoor locations, tunnels and urban canyons, where GPS signals may be weak and/or multipath issues could be present. The method can be applied to existing mobile phones and complement the phone's GPS positioning system, thereby making a hybrid positioning system in some embodiments where the phones are aware of their locations both inside and outside buildings.

Some embodiments provide a method of determining a location of a mobile device. The method receives a first group of signals with known transmission patterns at the mobile device from a set of transmitters. The first group of signals includes at least one multipath signal. The method computes a first set of parameters from the first group of signals by using the known transmission pattern. The method receives, from a database, a second set of parameters that are computed from a second group of signals. The second group of signals includes at least one multipath signal. Each parameter is associated with a location where a corresponding signal from the second plurality of signals was received. The method compares the first set of parameters with the second set of parameters and determines the location of the mobile device based on the comparison.

Some embodiments provide a computer readable medium that stores a computer program for determining a location of a mobile device. The computer program is executable by at least one processor. The computer program includes several sets of instructions. The sets of instructions include a set of instructions for receiving a first group of signals at the mobile device from a transmitting device over a set of transmission channels. The transmitting device includes a group of antennas. Each of the signals is received from one of the antennas of a transmitting device. The sets of instructions include a set of instructions for characterizing the set of transmission channels to compute a first plurality of parameters associated with the first plurality of signals. The sets of instructions include a set of instructions for retrieving, from a database, a second group of parameters that are associated with a group of signals previously received from the transmitting device by a set of scanning devices. The sets of instructions include a set of instructions for correlating the first group of parameters with the second group of parameters. The sets of instructions include a set of instructions for determining the location of the mobile device based on the correlation.

Several more detailed embodiments of the invention are described in sections below. Before describing these embodiments further, Section I provides an overview of several terms and concepts used in some embodiments. Next, Section II discusses characterizing radio signals to populate a reference database with the signal characteristics. Section III describes finding location of a device by characterizing received signals and comparing the characteristics with those stored in the reference database. Next, Section IV describes several alternative embodiments to populate a reference database with the signal characteristics. Section V then describes multiple antenna systems which can be used in an environment where there are no multipath phenomena. Next, section VI describes an example showing how to extract signal or channel characteristics from WLAN 802.11 signals. Finally, section VII provides a description of a computer system with which some embodiments of the invention are implemented.

I. Terms and Concepts

A. Inphase and Quadrature

A general wireless system includes a transmitter component and a receiver component. The transmitter first performs digital modulation of data into an analog baseband signal. Analog modulation then shifts the center frequency of the analog signal up to the radio carrier, and the antenna transmits the signal. The receiver's antenna receives the analog radio signal and uses the known carrier to demodulate the signal into the analog baseband signal. The receiver's baseband then converts the analog baseband signal into digital data. In a direct down-conversion receiver the carrier frequency is directly converted to two baseband signals, the in-phase signal I(t) and the quadrature phase signal, Q(t).

The modulated physical signal (the passband or RF signal) can be represented by a complex value called "the equivalent baseband signal":

$Z(t)=I(t)+jQ(t)$ where I(t) is the inphase signal, Q(t) is the quadrature phase signal, and j is the imaginary unit. The frequency spectrum of this signal includes negative as well as positive frequencies.

The physical passband signal corresponds to the real portion of the above formula:

$$I(t)\cos(wt)-Q(t)\sin(wt)=Re\{Z(t)e^{jwt}\}$$

where W is the carrier angular frequency in radian per second. In an "equivalent baseband model" of a communication system, the modulated signal is replaced by a complex valued "equivalent baseband signal" with carrier frequency of 0 hertz, and the RF channel is replaced by an "equivalent baseband channel model" where the frequency response is transferred to baseband frequencies. Thus, the down conversion procedure replaces a real channel with a complex equivalent.

B. Convolution

Convolution is a mathematical operation on two functions that produces a third function that is typically viewed as a modified version of one of the original functions. In signal processing, convolution is the process of constructing the output of an electronic system for any arbitrary input signal by using the impulse response of system.

C. Multipath

Multipaths occur when the signals from the transmitters are received at a receiver after the signals are reflected by objects such as buildings around the receiver. Multipaths specially happen in areas with many buildings, such as city centers. As described in detail below, although multipath propagation is considered as interference in other systems and degrade their performance, different embodiments of the invention take advantage of multipath signals to determine position of mobile devices with higher accuracy.

D. Symbol

A symbol is a state or significant condition of a communication channel that persists for a fixed period of time. A transmitter places symbols on the channel at a known symbol rate and the receiver detects the sequence of symbols and reconstructs the transmitted data. A significant condition is one of several values of a signal parameter that is chosen to represent information.

II. Populating Channel Characteristics Database

FIG. 1 conceptually illustrates a geographic area 100 that has multiple wireless networks and a mobile device 105 at coordinates (x,y,z) that has one or more wireless transceivers (not shown) that can use such networks for communication and positioning. For simplicity, what is referred in this specification as a mobile device, a mobile station, or a mobile includes user equipments such as cellular telephones, personal communications service (PCS) telephones, wireless-enabled personal digital assistants (PDAs), wireless modems, laptop computers, tablet computers, smart phones, handheld devices that include short range radios (such as IEEE 802.11 or Bluetooth® but do not have cellular receivers), handheld devices that include short range radios (such as IEEE 802.11 or Bluetooth® but do not have either cellular or GPS receivers), digital still/video camera, or other wireless devices that are network capable. Each type of network can also have different implementations. For example, the WLAN 802.11 standard can include 802.11b, 802.11a, 802.11g, and 802.11n. What is referred to as a cellular receiver in this specification is a receivers that operates on cellular frequencies that are licensed by the government and have a range of approximately 1 to 100 miles. The cellular network can include Global Mobile System (GSM), Code Division Multiple Access (CDMA), CDMA2000, Wideband CDMA (WCDMA), Time Division Multiple Access (TDMA), Frequency Division Multiple Access (FDMA), and other multiple access techniques.

The networks include GPS, cellular (e.g., 2G, 3G, 4G), WLAN 802.11, Bluetooth®, Radio-Frequency Identification (RFID), WiMAX, HD Radio™, UWB, ZigBee, and 60 GHz. Each type of network can also have different implementations. For instance, the WLAN 802.11 standard can include 802.11b, 802.11a, 802.11g, and 802.11n. The cellular network can include Code Division Multiple Access (CDMA), CDMA2000, Wideband CDMA (WCDMA), Time Division Multiple Access (TDMA), Frequency Division Multiple Access (FDMA), and other multiple access techniques. A mobile device can communicate wirelessly with one or more of these networks. The communication can be downlink from the network, for example, satellites 110 and 112, WLAN base-stations 115-117 (i.e., wireless access points 115-117), cellular towers 120 and 122, etc., to the mobile device 105. The communication can also be in the uplink direction from the mobile device to the network. FIG. 1 shows the downlink direction.

Some of the radio waves in FIG. 1 travel directly from the transmitter to the receiver, as illustrated by lines 125, while other radio waves are totally obstructed and do not reach the receiver, as illustrated by line 130. Yet, other radio waves encounter obstacles that cause reflections and multipaths before they reach the receiver, as illustrated by lines 135-138 which are directed to mobile device 105 from satellite 112, wireless access point 116, cell tower 120, and cell tower 122 respectively as illustrated in FIG. 1. Multipath propagation causes errors in GPS data, RSSI, AOA, TOA, TDOA and Doppler shift. For example, time delays such as TOA and TDOA represent the longer multipath distance rather than the actual distance between the transmitter and the receiver. The longer multipath propagations also result in smaller signal amplitude for indicators such as RSSI, as well as incorrect values for AOA and Doppler shifts. These errors cause incorrect mobile device position calculations for traditional triangulation techniques.

Some embodiments of the invention overcome the limitations caused by multipath propagation since instead of triangulation each channel is characterized at various positions and the characterization data are stored in a reference database. As described further below, in locating a wireless device, the device initially receives wireless signals. These signals are then characterized and compared to the data stored in the reference database. Interpolation or extrapolation is then used in some embodiments to find the position of the wireless device.

Figure 2:
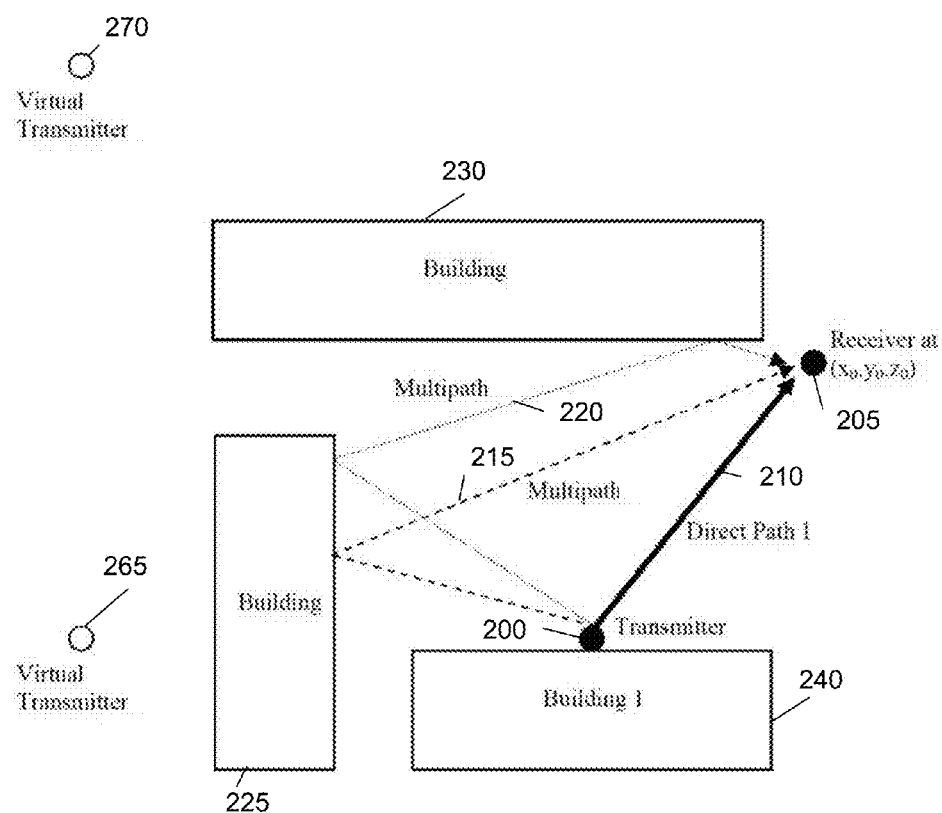
FIG. 2 conceptually illustrates a radio receiver receiving a direct path radio wave from a transmitter as well as two multipath waves.

The multipath problem is conceptually illustrated in FIG. 2. As shown, a radio transmitter 200, a radio receiver 205 placed at coordinates $(x_0,y_0,z_0)$, and several buildings 225-240. In this example, the receiver 205 receives a direct path radio wave 210, as well as two multipath waves 215 and 220 caused by reflections from obstacles, buildings 225 and 230, respectively.

Figure 3:
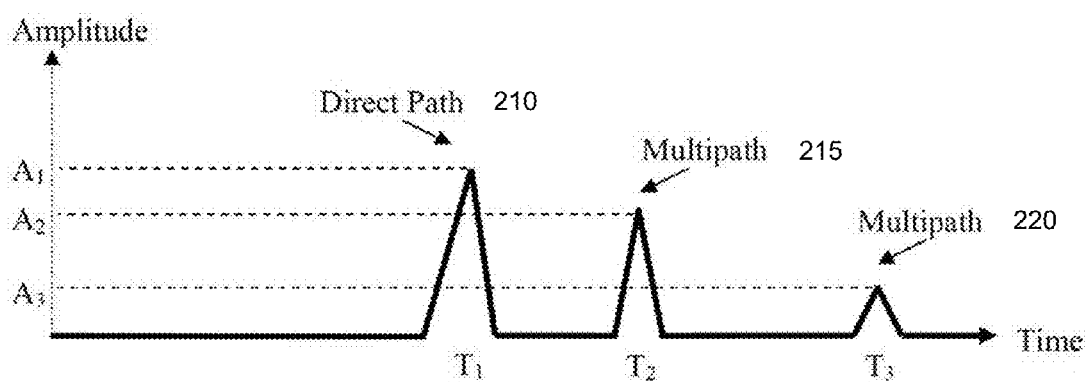
FIG. 3 conceptually illustrates amplitude of a multipath channel profile of some embodiments.

FIG. 3 conceptually illustrates the amplitude of the superposition of these waves 210, 215 and 220 at the receiver's baseband after down-conversion and processing. It should be noted that the transmitter typically uses pulse shaping to contain the spectrum of the transmitted signal to a narrowband. The receiver also convolves with a pulse shape. These actions result in a delta function. Down-conversion is a conversion of a digitized real signal centered at an intermediate frequency (IF) into a basebanded complex signal centered at zero frequency. An 802.11 receiver characterizing its channel and measuring time of arrival delays is described in detail in the above mentioned U.S. Patent Publication 2009-0243932. The accuracy of position calculation in some embodiments increases as the number of transmitters is increased. Although the method can be applied to any radio-based positioning system, widely available systems such as WLAN 802.11 are particularly useful because of the large number of public hotspots or private WLAN access points that are available. This means that a WLAN radio receiver can often find several nearby WLAN transmitters. Cellular towers, on the other hand, are far fewer in numbers and are much further distances apart. FIG. 3 shows the direct path peak occurring at time $T_1$ and the peaks corresponding to multipaths 215 and 220 occurring at later times $T_2$ and $T_3$, respectively.

Multipaths that are caused by reflections from obstacles create virtual transmitter access points. For instance, the peak occurring at time $T_2$ that is caused by multipath 215 can be viewed as originating from virtual transmitter 265, where the position of virtual transmitter 265 is reflection of transmitter 200 on the wall of building 225. Likewise, the peak occurring at time $T_3$ that is caused by multipath 220 can be viewed as originating from virtual transmitter 270, where the position of virtual transmitter 270 is reflection of virtual transmitter 265 on the wall of building 230. Therefore, the greater the number of multipaths the greater is the number of virtual transmitters which translates into a higher accuracy for the positioning method of this invention. This is in sharp contrast to conventional methods, where multipath propagation degrades system performance.

The signal that is transmitted by a transmitter is an input signal that goes through a wireless channel. A receiver then receives the output signal of the channel. The received signal of the channel is convolution of the input signal with the impulse response of the channel. In the frequency domain this means that the fast Fourier transform (FFT) of the received signal is multiplication of the FFT of the input signal with the FFT of the impulse response of the channel. Throughout this specification the terms channel impulse response, channel multipath profile, channel profile, and channel characteristics are used interchangeably.

FIG. 3 illustrates the amplitude of the multipath profile characterization of this particular transmitter's channel at coordinate $(x_0,y_0,z_0)$. This figure represents the absolute value (modulus of the real and imaginary part) of transmitter's channel impulse response at location $(x_0,y_0,z_0)$. Some embodiment use scanning receivers to gather channel characterization data (such as shown in FIG. 3 or parameters derived from the channel) at various positions and to store them in a reference database. The channel characterization at a given position is then used as a signature to identify that location and distinguish it from other locations, since for a given transmitter such as transmitter 200 the shape of FIG. 3 is a function of coordinates $(x_0,y_0,z_0)$. For example, the further away distance the point $(x_0,y_0,z_0)$ is from transmitter 200 the longer are the arrival times of the direct path waves and subsequent multipath waves. A mobile device in some embodiments then characterizes the channels it experiences and uses reference database interpolation and matching to find its position. For instance, a mobile device that is at coordinate $(x_0,y_0,z_0)$ will experience the same scanned channel characteristics illustrated in FIG. 3. Then, when searching through the reference database, these characteristics will match the measurements taken by scanning receivers at location $(x_0,y_0,z_0)$. Hence, the mobile device calculates $(x_0,y_0,z_0)$ as its location. That is, the mobile device finds that $(x_0,y_0,z_0)$ is its location. When the mobile is near (but not at) coordinate $(x_0,y_0,z_0)$, i.e., there is no matching data in the database, interpolation and extrapolation methods will be used to find its location in some embodiments. Multipath propagation reduces the accuracy of conventional triangulation positioning methods by introducing timing and distance errors. However, with the disclosed method, multipath propagation increases the positioning accuracy because it makes the channel characteristics signature at one location more unique and distinguishable from another location.

FIG. 3 only shows the amplitude of the channel's multipath profile. However, the signal illustrated in FIG. 3 also has a corresponding phase component because down-converted RF signals are complex. The fast Fourier transform (FFT) of the amplitude and corresponding phase of the signal results in the channel's FFT coefficients. The channel's FFT coefficients are one of the parameters that are stored in the reference database in some embodiments. Some embodiments also process the amplitude and corresponding phase of a signal to derive other channel parameters. For instance, some embodiments perform peak detection on the profile illustrated in FIG. 3 and store the magnitude and corresponding phase of the peaks and the times at which the peaks occur (i.e. $T_1$, $T_2$ and $T_3$ shown in FIG. 3).

There are many parameters that can be used to characterize a communication channel. As FIG. 3 illustrates, some are direct channel parameters (i.e., parameters directly related to/extracted from the received signal) while others are indirect parameters that are derived from the channel. An example of a direct channel parameter is the time of arrival delay using preamble correlation since it is directly extracted from FIG. 3. An example of an indirect channel parameter is the receiver's equalizer filter coefficients. The parameters that can be used for characterizing communication channels include channel multipath profile (e.g., a multipath profile shown in FIG. 3), channel FFT coefficients (e.g., FFT of amplitude and phase of a multipath profile), equalizer filter coefficients, time of arrival delay using preamble correlation, time of arrival delay using RSSI transition, time difference of arrival, beacon signal strength, angle of arrival, phase of each pilot tone, amplitude of each pilot tone, and Doppler shift (for moving objects). An equalizer (also referred as rake receiver) uses the channel coefficient estimates to do division and multiplication in the FFT domain to decode characterization data. Doppler shift can be used to calculate the speed and direction of a moving object. This can in turn be used to predict future positions and complement the position calculation method.

FIGS. 2 and 3 illustrate one transmitter of one type of radio. In some embodiments, the transmitter 200 shown in FIG. 2 is a WLAN 802.11 radio transmitter. In these embodiments, FIG. 3 shows one characterization of an 802.11 channel between transmitter 200 and receiver 205. The same 802.11 channel can be characterized using one or more of the parameters described above. Also, in an environment where there are 802.11 radio transmitters other than transmitter 200, those 802.11 channels can be characterized by repeating channel characterization illustrated in FIGS. 2 and 3. Moreover, when there are other types of radio transmitters (e.g. GPS, cellular, Bluetooth®, WiMAX, HD Radio™, UWB, 60 GHz, etc.), channels associated with those transmitters can be characterized similarly by repeating channel characterization illustrated in FIGS. 2 and 3 for those channels too. Thus, in terms of populating a centralized characterization database for a given position coordinate there are at least three categories of information: (1) multiple (i.e., different) characterization parameters of the same radio channel (e.g., channel multipath profile, channel FFT coefficients, equalizer filter coefficients, time of arrival delay using preamble correlation, time of arrival delay using RSSI transition, time difference of arrival, beacon signal strength, angle of arrival, phase of each pilot tone, amplitude of each pilot tone, Doppler shift, etc.), (2) multiple radios of the same radio types (e.g., 802.11 transmitter A, 802.11 transmitter B, etc.), and (3) multiple radio types (e.g., GPS, 802.11, cellular, Bluetooth®, etc.). Using multiple radios improves the accuracy. In addition, using multiple radio types enables a mobile device to still determine its location even when one type of radio is not available. For instance, a mobile device that is capable of communicating with cellular radio as well as a short range radio (such as 802.11 or Bluetooth®) can determine its location in an indoor location where cellular coverage is not available.

Figure 4:
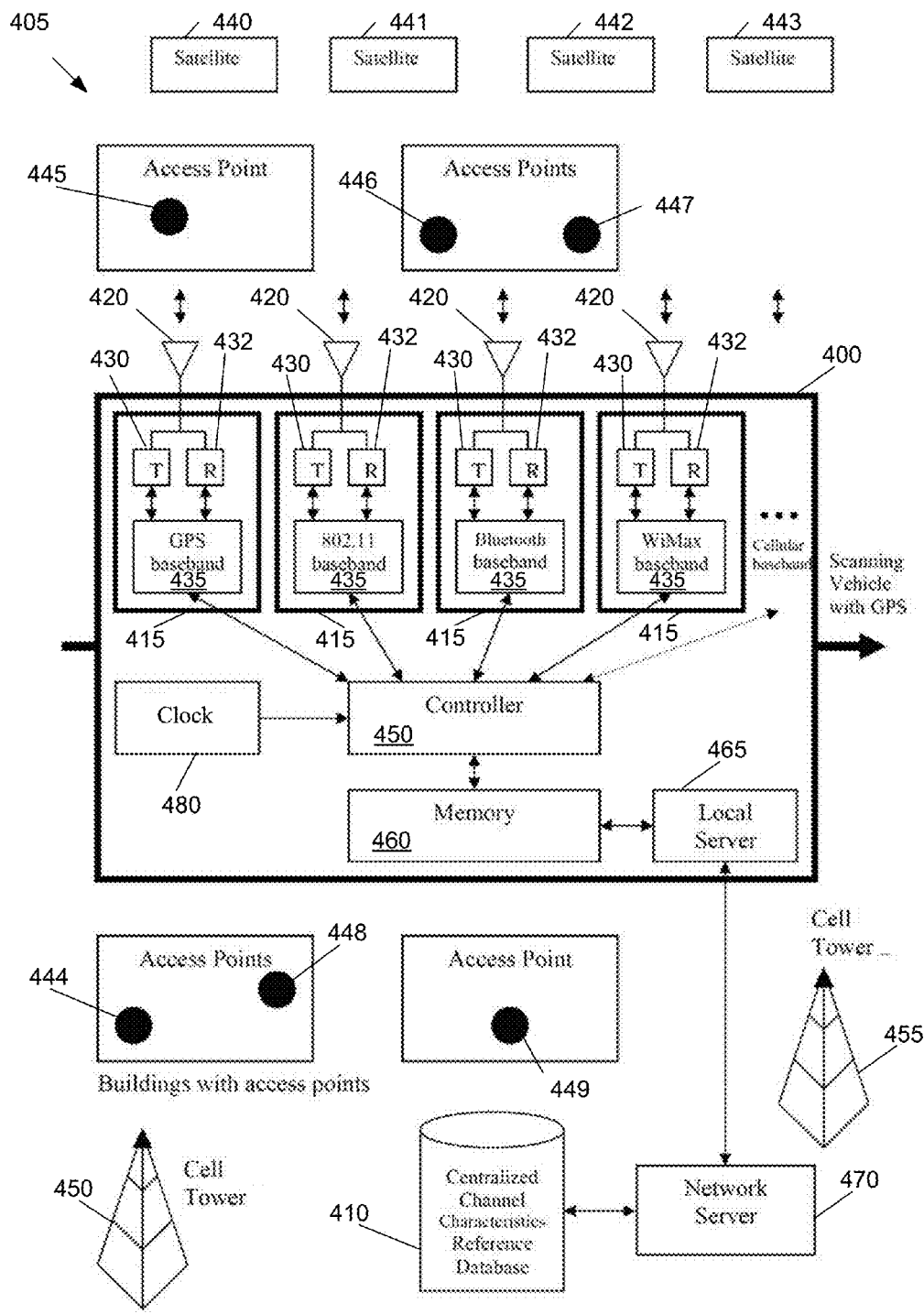
FIG. 4 conceptually illustrates a moving scanner of some embodiments.

FIG. 4 illustrates a conceptual environment 405 for characterizing the various types of radio communication channels and storing them in a reference database in some embodiments. Specifically, FIG. 4 shows an exemplary moving scanner 400 of some embodiments. A moving scanner is a moving object that is equipped with one or more radios and can move about a geographical area of interest. For instance, a moving scanner in some embodiments is a vehicle (e.g., a regular passenger car or a commercial truck) equipped with radios to receive signals and can move to locations within the geographical area of interest. In indoor environments, a moving scanner can be a small vehicle or a push-cart equipped with one or more radios. A moving scanner can also be a mobile device that is equipped with radio to receive radio signals at different locations to which the mobile device is carried by a user using the device. In some embodiments, the moving scanners are portable wireless devices, consumer hand-held wireless devices, GPS-enabled media players, GPS-enabled IPods®, laptops, and the like. One of ordinary skill in the art would realize that other moving objects equipped with radios can be used without deviating from the teachings of the invention.

The moving scanner includes equipments for scanning the environment, characterizing the various types of radio communication channels that are present, and storing them in a reference database. The moving scanner 400 stores channel characteristics in a reference database 410. In some embodiments, the moving scanner 400 is equipped with different types of communications radios 415. These radios include radios of GPS, WLAN, cellular (2G, 3G, 4G), Bluetooth®, WiMAX, HD Radio™, UWB and 60 GHz standards. In some embodiments, the moving scanner 400 moves around different locations in a geographical area of interest. Each radio 415 includes an antenna 420, a transmit module 430, a receive module 432, and a digital baseband module 435. The radios 415 of the moving scanner 400, as well as the radios (e.g., satellites 440-443, access points 444-449, and cell towers 450 and 455) in the geographical area of interest (i.e., the environment 405) may be Multiple-Input Multiple-Output (MIMO) systems that have multiple antennas which transmit independently and hence improve the accuracy by providing more channel characteristics data. The MIMO embodiments of the invention are described in detail further below.

A GPS is a CDMA system that uses Pseudo Noise (PN) codes with embedded data that provide satellite locations and times. The moving scanner's GPS radio is of commercial quality in some embodiments and is used to characterize the GPS communication channel. In some embodiments, the GPS radio also provides position values for all other radio communication channel readings. A controller module 450 manages the operations of all radios 415. For example, the controller 450 can instruct a radio 415 to scan for a particular signal and perform a channel measurement on a particular frequency with a particular FFT size and measurement time. The baseband 435 of each radio 415 processes the received signals to characterize the communication channel of that radio. The controller 450 of some embodiments then transfers the channel characteristics data in an appropriate format into local memory 460. The configuration of most of the wireless networks does not change with time since the signal sources (cell towers, permanent wireless access points, etc) do not move. However, some networks change with time because the signal sources move (e.g. GPS satellites make complete orbits of the earth every 24 hours). For those channels that exhibit a time varying dimension, the channels are characterized at different time instances. A clock 480 is used to put a time stamp on the channel characteristics that are stored in the local memory 460. In some embodiments, the clock can be obtained from cell towers, GPS satellite clocks, or other external sources.

In some embodiments, the channel characteristics data stored in memory 460 is transferred to a centralized networked database 410 at regular time intervals. In some embodiments, the transfer of data is carried out by a local server 465 that makes a wired or wireless connection (e.g., using cellular, public hotspot WLAN, or other wireless method) to a networked server 470 which after authentication transfers the data to the centralized reference database 410. In some embodiments, the networked server 470 is also physically or logically part of an access point 444-449. One of ordinary skill in the art would realize that components can be added to or removed from the moving scanner conceptually illustrated in FIG. 4 without deviating from the teachings of the invention.

In some embodiments, the moving scanner 400 moves (e.g., is driven around) and scans geographical areas periodically and update the centralized database. Whenever the moving scanner 400 takes a new measurement at coordinates and provides newest channel characteristics at the coordinates, the networked server 470 compares the newly measured channel characteristics data with those already stored in the database 410 and updates the database because channel characteristics may have changed. Channel characteristics at a particular location may be changed when some previously existing transmitters that were transmitting radio signals to the location are removed altogether or moved to a new location; new transmitters are added and transmit additional signals to the location; new buildings are built and obstruct signal paths; and/or previously existing buildings are demolished and no longer block or reflect signals. For instance, when new measurement data shows that no data is received from a previously existing transmitter with a particular media access control address (MAC address or MAC ID), it can be concluded that the transmitter may have moved. In such cases, the characterization data associated with that transmitter will be removed from the centralized database 410 in some embodiments. Alternatively, when a transmitter MAC ID is detected that is not in the database, the ID and the characterization data associated with that new transmitter will be added to the database.

In alternative embodiments, instead of having a moving scanner (e.g., a scanning vehicle) moving around to characterize the channels, fixed radios are used that are installed at different locations within the areas of interest. For instance, fixed GPS receivers or other types of wireless RF radios that are networked are installed at known coordinates on posts and buildings in some embodiments. These fixed radios characterize radio channels and generate characteristics data, for example GPS channel characteristics data (such as delay, phase, range to satellite, their IDs, etc.) and transmit the data at different time instances to a network server that processes the data further before storing the time, channel characteristics and position coordinates in the centralized reference database. Since pre-existing or newly added low-cost consumer radios can be used to characterize signals and generate the data, the cost of driving to scan and update the database is eliminated and the implementation cost is reduced. In some embodiments, the fixed radios are short range access points.

Figure 5:
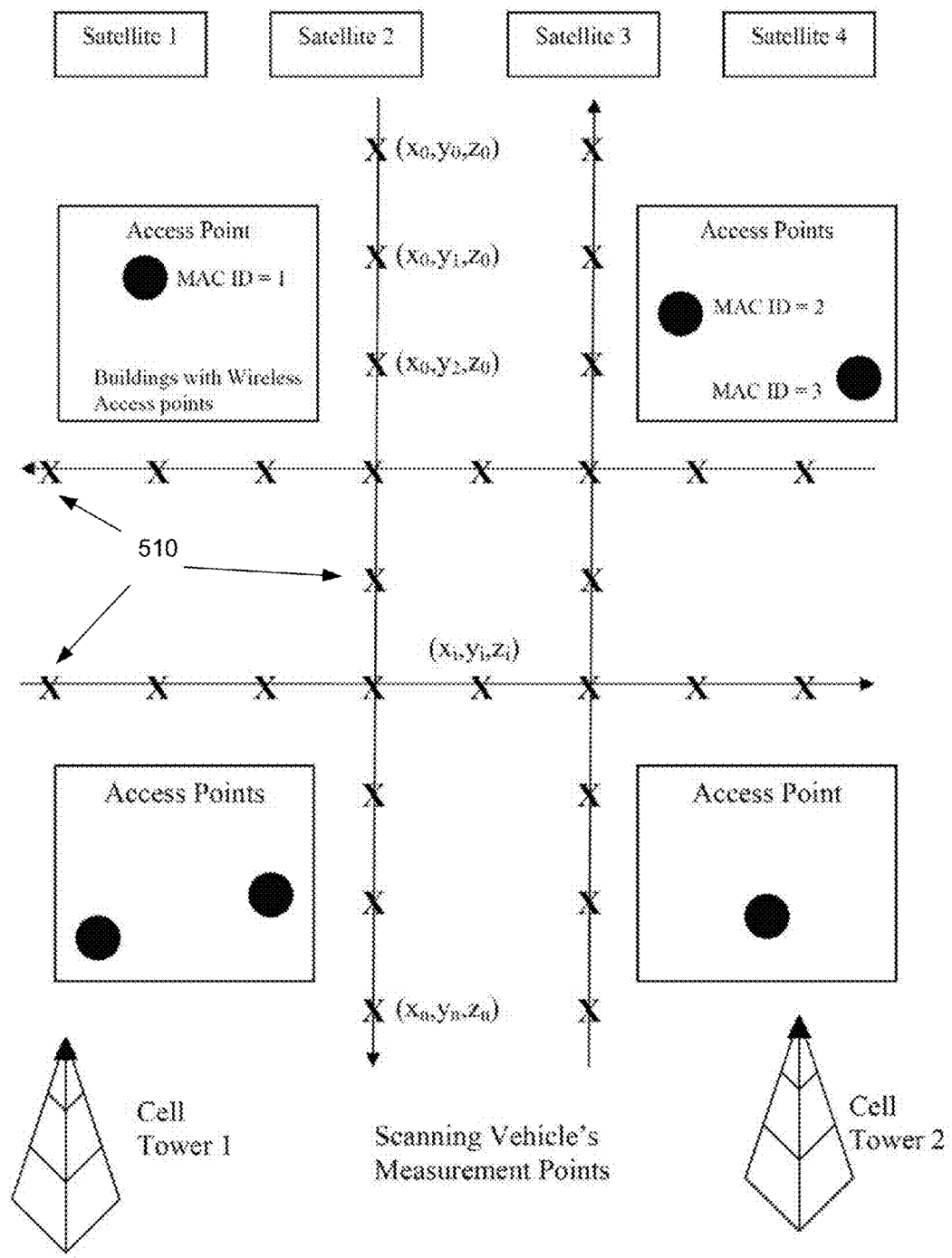
FIG. 5 conceptually illustrates examples of paths that a moving scanner takes in some embodiments.

In other embodiments, the scanning illustrated in FIG. 4 and further below in reference with FIG. 5 is performed by position-enabled mobile devices with communication radios (e.g., mobile or hand-held devices moved around by humans on sidewalks or inside malls). These mobile devices can use GPS or other type of radios to calculate their own positions first. They can then characterize other radio communication channels that are present at their positions, and upload and store the characterization data in the reference database. These alternative embodiments are described further below.

FIG. 5 conceptually illustrates exemplary paths taken by a moving scanner (e.g., a scanning vehicle or a hand-held device) to characterize the communication channels at measurement points along the paths. FIG. 5 illustrates that communication channels are characterized at certain points along the path of the moving scanner (not shown). The points 510 marked with X's in FIG. 5 are where channel characteristics measurements are performed. In some embodiments, the moving scanner takes measurements on each side of a road. In other embodiments, the measurements could be carried out on only one side of the road. When there are more than several lanes on the road, the measurements can be carried out on more lanes. Generally, more measurement points within a geographical area of interest translate into more accurate sampling of the area.

Since the channel characteristics are measured by the moving scanner only at the locations marked with X's, finding accurate location information of the locations in between those X's requires some form of interpolation (or extrapolation) and matching. That is, interpolation and matching are required because the channel characterization data of those in-between locations would not exactly match to the data measured at locations marked with X's. The accuracy of the interpolated values and this positioning method is increased by having locations marked with X's closer together and having many multipaths received by the receiver at the X locations.

In some cases, some of the characterized X locations may not experience multipaths. Also, some locations may only experience one multipath (reflected path) and no direct path. In such situations, the measured channel profile will exhibit one peak, and that provides little information for the proposed multipath-based method in some embodiments. Thus, the "effective" grid points are those grid points that produce multi-peak profiles. In an environment where multipath phenomena do not occur, time-delay methods (such as that described in the above mentioned, U.S. patent application Ser. No. 12/833,938) can be used in some embodiments. It should be appreciated that the triangulation is used to generate or update data for storing in the database. Triangulation, however, is not used when location of a mobile device is determined. As described further below, the location of a mobile device is determined by characterizing the signals that the mobile device receives and by comparing them with the information that is already stored in the database. Alternatively, differential phase methods such as the methods described in the above mentioned U.S. Patent Publication 2009-0243932 can be used to generate data for storing in the database. The system and method disclosed in FIG. 5 also apply to indoor situations, such as malls and office buildings, where smaller moving scanners, hand-held instruments, or fixed-location radios are used in some embodiments. The moving scanner's measurement points in more open spaces (outdoor or indoor) can resemble different patterns such as more densely sampled rectangular grids or irregular grid sampling patterns.

FIG. 6 conceptually illustrates an exemplary table (or list) 600 stored in the centralized channel characteristics reference database 410 in some embodiments. Table 600 lists the real and imaginary coefficients of a 64 point FFT of the WLAN 802.11 channels, where the received demodulated in-phase (I) and quadrature (Q) signals are in the time domain and the receiver performs FFT to take the complex signals back into the frequency domain. For each channel reading, the position of a moving scanner and an identifier of the transmitter (e.g., MAC ID) are also stored in the table 600. For example, at location $(x_0, y_0, z_0)$ the scanner receives two signals, one with a MAC address ID' and another with MAC address $ID_2$. Likewise, at location $(x_n, y_n, z_n)$ the scanner receives three signals with MAC addresses $ID_4$, $ID_5$, $ID_6$, respectively.

In some embodiments, the channel FFT coefficients may also be transformed into the time domain and stored. Table 605 shows the magnitude, phase and time of arrival delay of extracted peaks of a multipath channel profile at a receiver's baseband such as 802.11 baseband 435 illustrated in FIG. 4. Table 605 shows the amplitude of each channel's multipath profile and the corresponding phase information that represent the time representation of the channel. It is also possible to extract features of the channel's multipath profile such as the magnitude, phase and time delay of extracted peaks at the receiver's baseband. Table 605 shows that at location $(x_0, y_0, z_0)$ the signal with MAC address ID' has three peaks and the signal with MAC address $ID_2$ has one peak as indicated by peak index numbers. These peaks are extracted and their amplitude, phase and time delay are stored in the table. Likewise, at location $(x_n, y_n, z_n)$ the signals with MAC addresses $ID_5$, $ID_6$ and $ID_7$ have one peak, one peak and two peaks, respectively.

As described above by reference to FIG. 3, multipath propagations create multiple peaks of signal waves that can be considered to have been originated from virtual transmitters. A greater number of multipaths creates a greater number of peaks, which in turn makes the channel characteristics more unique and distinguishable. Since in some embodiments of the invention the methods of calculating positions of mobile devices rely on correlation and interpolation of channel characteristics, the accuracy of the calculation increases with multipath propagation. Therefore, unlike conventional methods which suffer from the presence of multipath, the methods of some embodiments of the invention use multipath propagation to its advantage.

In some embodiments, a reference database such as database 410 described above by reference to FIG. 4 contains tables for other WLAN channel characteristics information such as equalizer filter coefficients, time of arrival delay using preamble correlation, time of arrival delay using RSSI transition, beacon signal strength, angle of arrival, phase of each pilot tone, amplitude of each pilot tone, etc. in addition to the characteristics stored in the tables illustrated in FIG. 6. These additional tables in some embodiments also contain channel characteristics of other communication standards such as GPS, cellular (2G, 3G, 4G), Bluetooth®, WiMAX, HD Radio™, UWB and 60 GHz.

Figure 7:
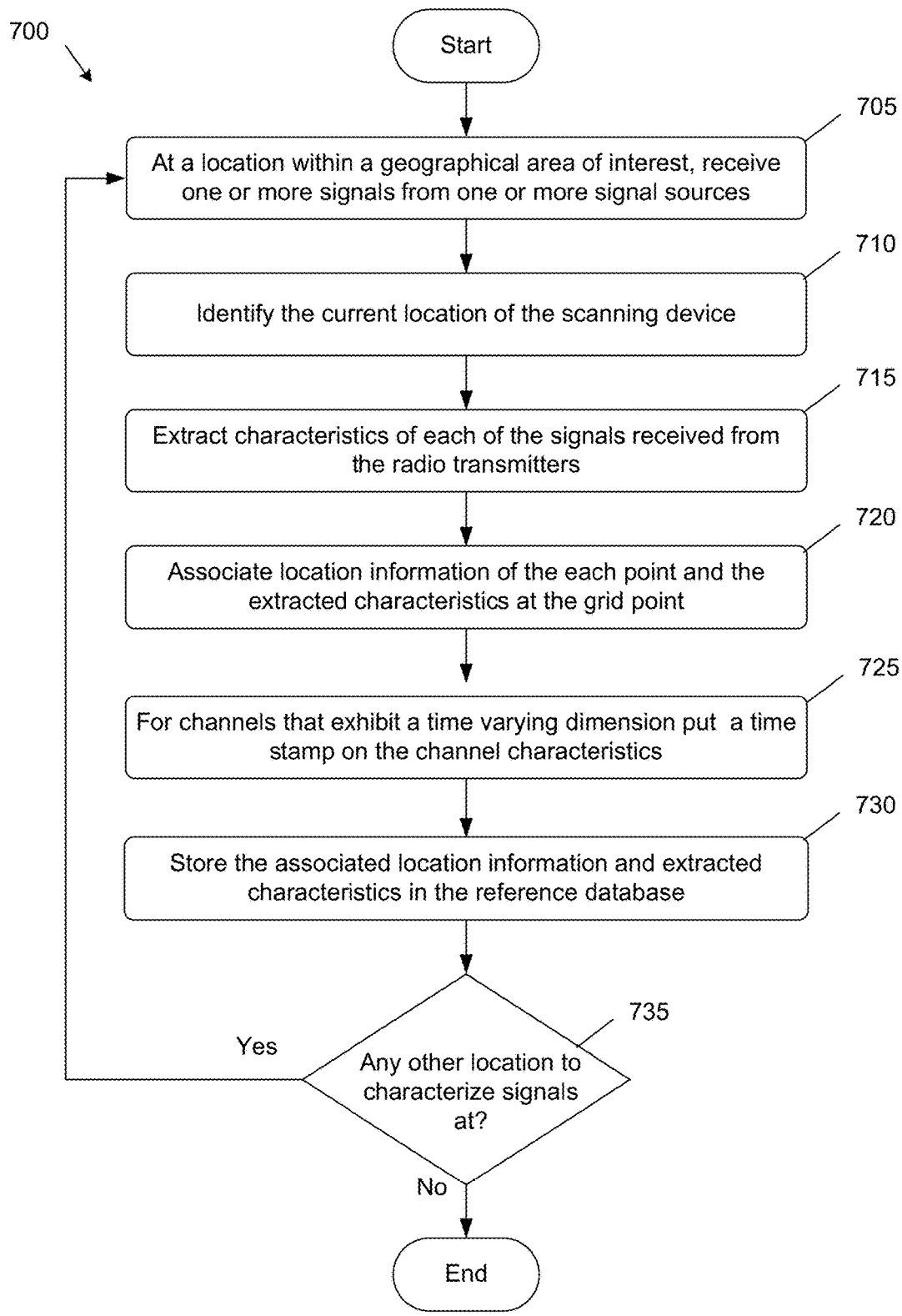
FIG. 7 conceptually illustrates a process that some embodiments use to populate a reference database with signal characterization data.

FIG. 7 conceptually illustrates a process 700 for generating the references database in some embodiments. In some embodiments, process 700 starts when a scanning device is directed to start scanning a geographical area of interest. A user can direct the mobile device by entering inputs, such as clicking a mouse button or tapping a touchscreen to select a user interface (UI) item, and/or pressing keys on a keyboard, etc. In other embodiments, the process starts when other system or software initiates a scanning. The scanning device can be any of the devices described above (such as a moving scanner, mobile device, hand-held device, or fixed-location radio receivers). As described above, each of these scanning devices in some embodiments is equipped with one or more radios of multiple types to receive radio signals.

Process 700 initially receives (at 705) one or more radio signals from one or more signal sources at a location within a geographical area of interest. The geographical area of interest is a predetermined area where scanning is to take place. In some embodiments, this area is an area where a service provider intends to provide location finding service to its customers carrying mobile devices. The signal sources in some embodiments include radio transmitters that the process receives signals from using radio receivers. The radio transmitters include any system that transmits signals for example in GPS, WLAN 802.11, cellular (2G, 3G, 4G), Bluetooth®, WiMAX, HD Radio™, UWB, and 60 GHz standards. The process receives these signals from different type of radio transmitters using receivers that uses the same signal standard. There can be multiple number of radio transmitters of the same type that the process can receive signals from. Also, there can be different implementations of the same radio type. For example, as described above, the WLAN 802.11 standard can include 802.11a, 802.11b, 802.11g, and 802.11n.

Once the process receives all signals from all signals sources, the process identifies (at 710) the current location where the process received the signals. In the embodiments where the scanning device is a moving scanner or a hand-held device, the location of the scanning device is known because the scanning device receives and characterizes signals at predetermined locations such as the locations marked with X's as described above by reference to FIG. 5.

Likewise, in those embodiments where an access points receives and characterize signals, the location information of the location where the access point is stationed is known. In other embodiments, the process identifies location information using one of the radio receivers, for example, a commercial quality GPS radio. In different embodiments, the process characterizes the signals it received and compares the characterization data with the data stored in a reference database to find out its location information as described above. In some embodiments, the location information includes the coordinates of the location.

The process then proceeds to extract (at 715) characteristics of each of the signals received from the radio transmitters. The process characterizes all signals from different types of radio transmitters and multiple radio transmitters of the same radio type. The process receives signals in direct path or multipaths (indirect or reflected paths) as described above. The process characterizes each signal using many different parameters. The parameters that can be used for characterizing communication channels may include channel multipath profile (e.g., a multipath profile shown in FIG. 3), channel FFT coefficients (e.g., FFT of amplitude and phase of a multipath profile), equalizer filter coefficients, time of arrival delay using preamble correlation, time of arrival delay using RSSI transition, time difference of arrival, beacon signal strength, angle of arrival, phase of each pilot tone, amplitude of each pilot tone, and Doppler shift (for moving objects), as described above. It should be noted that Tables 600 and 605 list of few of these parameters. A person or ordinary skill in the art would recognize that other parameters extracted by the disclosed techniques can also be stored in these or similar tables and databases.

Next, the process associates (at 720) the identified location information and the signal characteristics of the signals it received at that location. The association can be a form of table such as table 605 as described above by reference to FIG. 6, or in any type of data association. As described above, the configuration of most of the wireless networks does not change with time since the signal sources (cell towers, permanent wireless access points, etc) do not move. However, some networks change with time because the signal sources move (e.g. GPS satellites make complete orbits of the earth every 24 hours). For those channels that exhibit a time varying dimension, process 700 characterizes the channels at different time instances. The process uses a clock to put (at 725) a time stamp on the channel characteristics. In some embodiments, the process obtains the network clock from cell towers, GPS satellite clocks, or other sources. The process then stores (at 730) these associated location information, signal characteristics, and time stamp (if applicable) in a reference database. The database could be locally accessible or remotely accessible via networks. Some examples of a reference database are described above by reference to FIG. 4.

Next, the process determines (at 735) whether there is any other location within the geographical area of interest at which to characterize signals. The process in some embodiments goes through a list of predetermined locations and moves to a next location at which signal characterization has not been performed. In other embodiments where a scanning device is stationed at a known location, the process would not have another location to perform signal characterization at. In some embodiments, there are multiple numbers of scanning devices covering the geographical area of interest and the process performs signal characterization at the location within some portion of the geographical area of interest.

When the process determines that there are other locations within the geographical area of interest at which to perform signal characterization, the process returns to 705 to receive signals at the new location. Otherwise, the process determines that there are no more locations to perform signal characterization. The process then ends. The stored information (i.e., the associated location information and signal characteristics of signals) is used to determine the location of a mobile device within the geographical area of interest for which the information is collected.

One of ordinary skill in the art will recognize that process 700 is a conceptual representation of the operations used to generate the reference database and to determine the location of a device. The specific operations of process 700 may not be performed in the exact order shown and described. The specific operations may not be performed in one continuous series of operations, and different specific operations may be performed in different embodiments. Furthermore, the process could be implemented using several sub-processes, or as part of a larger macro process.

For instance, in some embodiments, process 700 is performed by one or more software applications that are executing on one or more scanning devices. In other embodiments, a second device (such as a networked server) which is communicatively coupled to the scanning device(s) can determine the location of the scanning device at 710 (e.g., by triangulation). Also, the scanning device in some embodiments sends the signals that the scanning device receives to the second device (e.g., to the networked server) which in turn performs operations 715-730. In some other embodiments, the scanning device performs (1) characteristics extraction at 715, (2) characteristics extraction at 715 and association at 720, or (3) characteristics extraction 715, association at 720, and time stamping at 725 while the second device performs the rest of the operations. In other words, any of the operations 710-7130 can either be performed by a scanning device or by a second device that is communicatively coupled to the scanning device.

III. Obtaining Location Information

A. Finding Location of a Mobile Device

Figure 8:
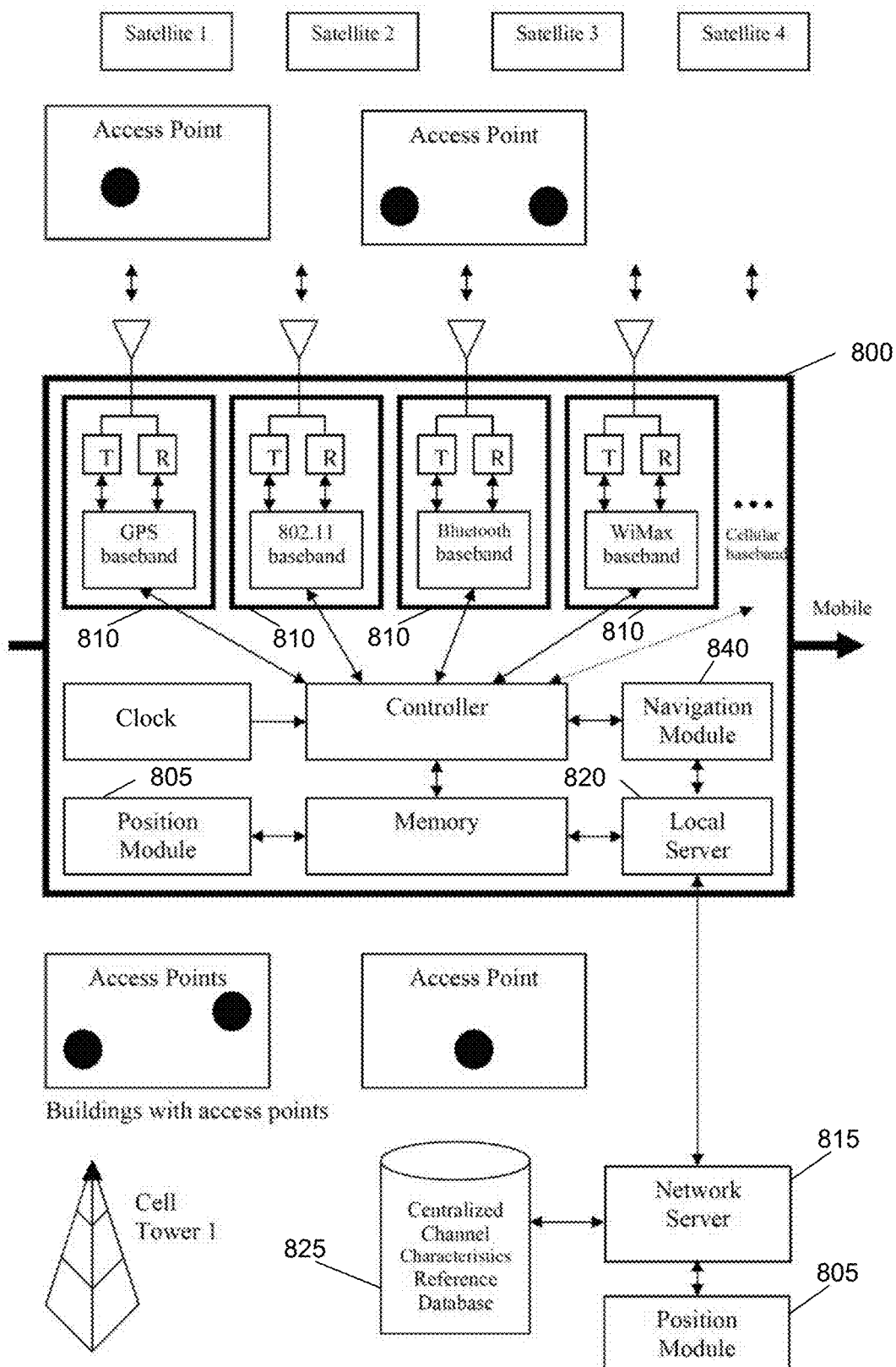
FIG. 8 conceptually illustrates a mobile device of some embodiments.

FIG. 8 conceptually illustrates a mobile device that characterizes signals it receives at a location in order to find its location information. In some embodiments, mobile device 800 characterizes its communication channels, and a position module 805 matches the channel characteristics with the channel characteristics stored in a reference database 825 to find the mobile device's position. The mobile device 800 in some embodiments has one or more types of radios 810 similar to those radios described above by reference to FIG. 4. The mobile device 800 uses the radios 810 to communicate and characterize the channels it experiences. While the signal characteristics measured by the scanner 400 illustrated in FIG. 4 are stored in a centralized database, the signal characteristics of the mobile device's communication channels measured by the mobile device 800 are compared to those stored in the centralized reference database in order to find or calculate the mobile device's position or location information. In some embodiments, position or location information of a mobile device includes the actual coordinates of the mobile device. In some embodiments, the comparison of the characteristics is carried out by a position module 805. In some embodiments, a position module can reside on the mobile device 800. In other embodiments, the position module is on a network server 815. In another embodiments, the position module may be on any other server that the mobile device 800 or the network server 815 can communicate with.

In some embodiments, the mobile device 800 is doing the calculations. In these embodiments, the mobile device's local server 820 makes a connection, for example, using cellular, public hotspot WLAN or some other wireless method, to a networked server 815 and after authentication requests and downloads a subset of the data from the centralized reference database 825. In some embodiments, there is no need for the mobile device to download the entire reference database since the approximate location of the mobile device is known from prior position calculations or from the beacon signals and cell tower signals the mobile device receives. The position module 805 on the mobile device 800 then compares the mobile device's channel characteristics with those downloaded from the reference database 825 and uses interpolation (or extrapolation) and matching techniques to find the mobile device's position or location information.

In other embodiments, position calculation is performed on the network server. In these embodiments, there is no need for the mobile device 800 to request and download characterization data from the reference database 825. Instead the mobile device 810 in these embodiments transfers its channel characteristics measurements to the network server 815 and the server's position module 805 compares them to those in the reference database and uses interpolation and matching to find the mobile device's position. In some embodiments, the position module 805 is a part of or running on the network server 815. In other embodiments, the position module 805 resides on another server and communicates with the network server 815. The server 815 then sends the mobile device's calculated position back to the mobile device 800. A navigation module 840 on the mobile device may also use the calculated position for navigation purposes. One of ordinary skill in the art would realize that components can be added to or removed from the mobile device 800 conceptually illustrated in FIG. 8 without deviating from the teachings of the invention.

In some embodiments, the signal characterization data stored in a centralized database are corrected if the data contains inconsistencies or are outdated. The measurements and calculated position of a mobile device may flag database inconsistencies to the networked server so that they are corrected. After the position module 805 on the mobile device 800 or on server 815 has calculated the location of the mobile device 805 it can compare the measured channel characteristics data with those stored in the database and notify the networked server 815 about inconsistent data.

The inconsistencies can be caused when some previously existing transmitters that were transmitting radio signals to the location of the mobile device are removed, new transmitters are added and transmit additional signals to the location, new buildings are built and obstruct signal paths, previous existing buildings are demolished and no longer block or reflect signals. For example, the mobile device receives signals from three access points and the mobile device's position is calculated by the position module based on the signal characteristics from those three access points. However, the database also has a fourth access point signal for scanned points that are close to the mobile device's position. This could indicate that the fourth access point is no longer functioning or has been moved from the location where the fourth access point used to be stationed. In some embodiment, the networked server 815 can then remove or initiate a removal of the centralized database entries for the fourth access point, or send a service request to a scanning device (e.g., moving scanner, mobile devices, access points, etc.) to scan that area again in order to update the database 825.

B. Position Calculation

Some exemplary position calculation methods of the invention will now be described. Suppose that a reference centralized database includes sampled versions of the channels' multipath profile illustrated in FIG. 3 denoted by $d_{ij}(k)$. The index j represents a particular transmitter (for example, each unique MAC ID represents one value for j) and index i represents each position characterized by a scanning device (e.g., scanning vehicle, access points, mobile scanning device, etc.) as illustrated in FIG. 5 (the points marked by X)

that are stored in a database as a table illustrated in FIG. 6. In this example, the variable k is a sampled version of time for the channel's multipath profile that is stored in the database. Suppose also that the mobile device illustrated in FIG. 8 whose position is to be determined sees transmitter j and measures the transmitter's channel's multipath profile. The profile is then denoted by the notation, $d_j(k)$.

In order to find out the position of the mobile device, the profiles measured at the position of the mobile device are compared and correlated with the profiles which were measured by one or more scanning devices at each measurement position and stored in the database. The correlation can be performed by using the multipath channel profiles as shown in FIG. 3, or by using the extracted peak information of the multipath channel profiles as shown in table 605 illustrated in FIG. 6. The higher the correlation, the closer the mobile device is to that particular database position. That is, the higher the correlation between the profiles, the closer the mobile device is to that particular position at which the profile stored in the database is measured. The value of the correlations can be normalized and used as weights when calculating the position of the mobile device. In this following simple example, it is assumed that clocks of the access points and the mobile device (as well as the scanning device's radios) are synchronized. However, the clock synchronization is not a requirement in some embodiments.

Figure 9:
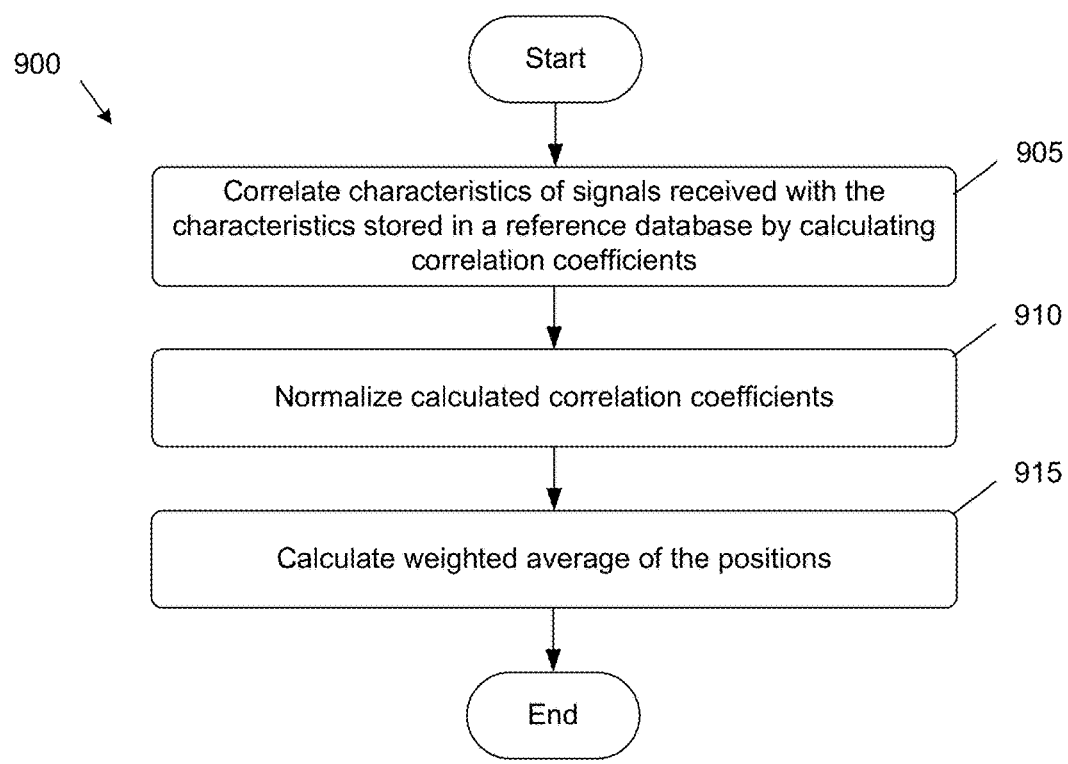
FIG. 9 conceptually illustrates a process that performs interpolation or extrapolation of sample data stored in a database to calculate the position of a mobile device in some embodiments.

FIG. 9 conceptually illustrates a process 900 performed by a position module such as position module 805 shown in FIG. 8. Specifically, FIG. 9 conceptually illustrates a process that performs interpolation or extrapolation of sample data stored in a database to calculate the position of a mobile device in some embodiments. Position calculations in some embodiments are described further below by reference to FIG. 10 and FIG. 11. In some embodiments, the position module can reside on the mobile device. In other embodiments, the position module is on a network server. In different embodiments, the position module may reside on any other server that the mobile device or the network server can communicate with.

In some embodiments, process 900 starts when the position module has characterized all signals received at a location via radio receivers of a mobile device from all signal sources transmitting the signals to the mobile device at the location. The position module has also retrieved characterization data stored in a reference database. In some embodiments when a channel exhibits a time varying dimension (e.g., because the signal source is moving to different locations at certain time such as an orbiting satellite), the channel characteristics stored in the database are characterized and time stamped at different instances. For signals from time varying sources, process 900 uses the time stamp when doing correlation.

In some embodiments, process 900 initially correlates (at 905) the characteristics profile of the received signals with the profiles or data retrieved from the reference database by calculating correlation coefficient. The process calculates a correlation coefficient for the profile of the received signals and each profile for the different locations stored in the database. An equation to calculate a correlation coefficient in some embodiments is:

$$C_i = \sum_j \sum_k d_j(k) d_{ij}(k)$$

where $C_i$ is the correlation coefficient for the profile measured by a mobile device and the profile measured by a scanning device at a position with coordinates $(x_i, y_i, z_i)$ that has index i when stored in the database. Non-coherent or coherent correlation can be used here. Non-coherent correlation uses just the amplitude of the multipath profile, whereas coherent correlation uses both amplitude and phase of the multipath profile. A variation of the above equation can be made by adding a Gaussian multiplier centered on the extracted peaks of the reference database's channel measurements. The Gaussian can have a standard deviation that depends on the database grid sampling distance and sampling frequency of the receiver. This improves accuracy in the presence of sampling errors and measurement errors.

Next, the process normalizes (at 910) the calculated correlation coefficients. The correlation coefficients can be normalized in some embodiments by dividing them with the sum of all correlation coefficients (e.g., of all nearby locations in the database) as shown by this equation:

$$w_i = \frac{C_i}{\sum_i C_i}$$

where $w_i$ is the normalized correlation coefficient and is also the weight for scanning device database position that has index i.

Next, the process calculates (at 315) the position of the mobile device (x, y, z) by calculating a weighted average value of the database positions. The weighted average value of the database positions $(x_i, y_i, z_i)$ is calculated using these equations:

$$x = \sum_i w_i x_i;\ y = \sum_i w_i y_i;\ z = \sum_i w_i z_i$$

The weighted average of the database positions is the calculated position of the mobile device which used this interpolation technique. The process then ends.

One of ordinary skill in the art will recognize that process 900 is a conceptual representation of the operations performed to do interpolation for position calculation. The specific operations of process 900 may not be performed in the exact order shown and described. The specific operations may not be performed in one continuous series of operations, and different specific operations may be performed in different embodiments. Furthermore, the process could be implemented using several sub-processes, or as part of a larger macro process (e.g., process 1000 which is described further below by reference to FIG. 10)

In some embodiments, the process 900 performs the correlation coefficient calculation and the weighted averages calculation operations using a limited number of positions stored in a database since the prior position of the mobile device limits the search area for the current position. That is, from prior position of the mobile device, it can be figured out which of the positions and their characterization data stored in the database are sufficient for those calculations, instead of using all positions and data stored in the database.

In some embodiments, in such cases when a prior position of a mobile device is not available, an approximate area for the possible location of the mobile device can be found from access point beacon signals and cell tower signals. That is, the profiles and signal characteristics of the locations within the approximate area can be found in the reference database using the identifications of the access points and cell towers that the mobile device received the beacon signals from.

An alternative correlation and interpolation operations that process 900 performs in some other embodiments is to first find the set of grid points, such as the measurements points marked with X's as illustrated in FIG. 5, that are nearest to the position of the mobile device and then to apply interpolating technique using measurements taken just at those nearest points. For example, when the reference grid positions stored in database make rectangular shapes, the correlation coefficients for the four corner X points of each rectangle are summed up and then the rectangle with the largest sum of the correlation coefficients is picked. Then, the mobile device's position can be found by performing a weighted average value calculation as described above but this time using only the four corners of the picked rectangle. In some embodiments, the correlation and interpretation can also be applied to the cases where grid positions stored in database make non-rectangular shapes.

In some cases, some of the reference grid locations do not produce multiple peak profiles and therefore they do not produce much information for the proposed method and are not effective grid points. In some embodiments, the characterization data measured at those locations that do not have multiple peak profiles are not stored in the reference database in the first place. In other embodiments, such data are stored in the reference database and then will be post-processed, be removed from the database, or just be ignored during the interpolation and matching stage. In these embodiments, only the nearest multiple peak profile grid points will be used. As a result, the shape of the "effective" grid in these embodiments can be irregular.

In some cases, the clock of the mobile device or the clocks of the scanning device's radio are not synchronized to the clock of the access points transmitting radio signals. This means that even at measured grid points the received multipath channel profiles from the mobile device could be shifted by some offset as compared to those in the reference database. That is, the multipath channel profiles measured by the mobile device at a location may be out of phase with the multipath channel profiles measured by the scanning device at the same location because the clocks that are used to timestamp are not synched. It follows that the multipath channel profiles measured by the mobile device would look shifted in time compared to the multiple channel profiles measured by the scanning device at the same location. As a result, the two sets of profiles would not be matching even though they are supposed to.

In order to overcome this problem, some embodiments detect the first peak of the channel profiles measured by the mobile device and then process the profiles such that the profiles are shifted in time to make the first peak appear at time 0. This process is performed on the multipath channel profiles stored in the reference database as well and thereby eliminating the time shift problem caused by the clocks that are not synchronized. When this process is preformed on the profiles illustrated in FIG. 3, the time $T_1$ would be shifted to 0, $T_2$ to $(T_2-T_1)$, and $T_3$ to $(T_3-T_1)$. Applying the method to the entries in table 605 illustrated in FIG. 6, the following time shifts are resulted: $T_{11}(x_0,y_0,z_0)$ to 0, $T_{12}(x_0,y_0,z_0)$ to $T_{12}(x_0,y_0,z_0)-T_{11}(x_0,y_0,z_0)$, $T_{13}(x_0,y_0,z_0)$ to $T_{13}(x_0,y_0,z_0)-T_{11}(x_0,y_0,z_0)$, . . . , $T_{61}(x_n,y_n,z_n)$ to 0, $T_{62}(x_n,y_n,z_n)$ to $T_{62}(x_n,y_n,z_n)-T_{6i}(x_n,y_n,z_n)$, etc. The same process is also applied to the mobile device's channel profiles before the position is calculated through matching and interpolation.

As described above by reference to FIG. 3, each peak in a profile corresponds to a real or virtual transmitter. The above process of time shifting the position of the first peak eliminates the need for clock synchronization, but it also eliminates one of the peaks/transmitters. When a position of a mobile device is calculated in two-dimensional space, there are two unknown variables for the mobile device's position, for example, (x, y). Since the process described above shifts the peaks in the profile to eliminate time synchronization requirements, there needs to be a minimum of two peaks after time shifting from all the access points in order to find values of the two unknown variables, x and y.

In these two-dimensional cases, three peaks of a profile for a channel between a single access point and a mobile device are sufficient to find the mobile device's location, since after time shifting the profile still has two peaks corresponding to two virtual transmitters. Alternatively, two profiles each with two peaks are sufficient to find the mobile device's two-dimensional location because even after time shifting of the peaks there will be one peak left for each profile, leaving two peaks to figure out the two unknown variables. In these cases, one peak left for each profile represents one virtual transmitter for each access point after the time shifting.

Likewise, when calculating a location of a mobile device in three-dimensional space, there are three unknown variables for the mobile device's coordinates, (x,y,z). In these three-dimensional cases, there needs to be a minimum of three peaks after time shifting of all the profiles for the channels between all the access points and the mobile device.

Another factor that can improve the accuracy of the matching and interpolation used in some embodiments is normalization of the energy of the channel's multipath profile. Referring back to table 605, the peaks of the profile of each access point that are extracted are normalized. For instance, an access point with a MAC ID of $ID_1$, the three peak amplitudes are normalized using an equation, $A_{11}(x_0,y_0,z_0)^2+A_{12}(x_0,y_0,z_0)^2+A_{13}(x_0,y_0,z_0)^2=1$. Likewise, an equation, $A_{61}(x_n,y_n,z_n)^2+A_{61}(x_n,y_n,z_n)^2=1$, can be used to normalize the peak amplitude values of an access point with MAC ID of $ID_6$.

In other embodiments, other signal characteristics are used when finding a position of a mobile device by interpolation and matching. For example, a scanning device calculates the ratio of the power of the signals from two access points and records the ratio in the reference database in addition to the other types of characterization data. A mobile device can also calculate the ratio of the power of the two signals it receives. Likewise, other types of characteristics such as the time difference of arrival can be calculated and then compared to what's stored in the reference database. Using the time difference of arrival of transmission from different access point to find location of a mobile device would require time synchronization of the access points. Another alternative utilized in some embodiments is to use the signal received from one access point and calculate the time difference between the first peak and second peak, first peak and third peak (or second peak and third peak), etc. Using the signal from one access point eliminates the need for time synchronization of the access points or time synchronization of the mobile with any access point. Accordingly, in these embodiments, the location of the mobile station is determined without synchronizing the access points with each other or with the mobile device.

Figure 10:
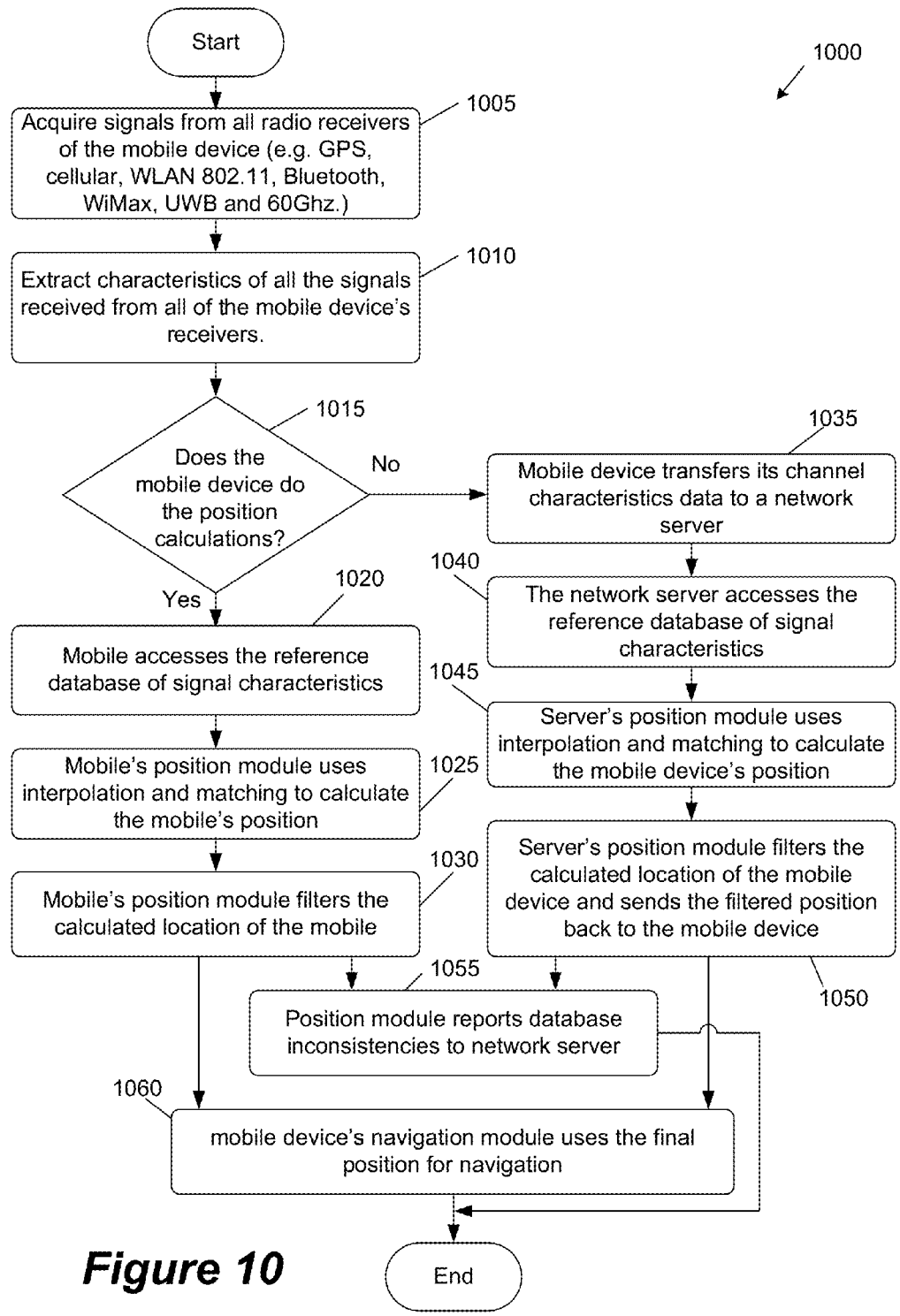
FIG. 10 conceptually illustrates a process that some embodiments use to find position of a mobile device.

FIG. 10 conceptually illustrates a process 1000 performed by a position module such as position module 805 described above by reference to FIG. 8. In some embodiments, the process 1000 is performed in order to find position of a mobile device. In some embodiments, the position module can reside on the mobile device. In other embodiments, the position module is on a network server. In different embodiments, the position module may reside on any other server that the mobile device or the network server can communicate with.

In some embodiments, process 1000 starts when a user of a mobile device equipped with a number of different types of radio receivers directs the mobile device to find out the position of the user and the mobile device. The user can direct the mobile device by entering inputs, such as such as clicking a mouse button or tapping a touchscreen to select a UI item, and/or pressing keys on a keyboard, etc. In other embodiments, the process 1000 starts when the mobile device initiates the position finding automatically without being directed by the user.

Process 1000 initially acquires (at 1005) signals from all radio receivers of the mobile device. The mobile device in some embodiments may be equipped with receivers to receive different types of radio signals from different sources transmitting the signals in different standards. For example, the mobile device may receive signals in GPS, cellular, WLAN 802.11, Bluetooth®, WiMAX, HD Radio™, UWB and 60 MHz standards. Most radios regularly transmit beacon signals, while others may go into a power save mode and require the mobile device to send out a probe request first.

Next, the process extracts (at 1010) characteristics of all the signals received by all of the mobile device's receivers. The process characterizes each received signal using one or more signal characterization parameters such as channel FFT coefficients, time of arrival delay using preamble correlation, beacon signal strength, etc. The details of extracting characteristics of signals are described above by reference to FIGS. 3-6. Each signal has a unique identifier that identifies the source of the signal. Such identifiers in some embodiments include MAC ID for WLAN, cell tower ID for cellular, Satellite ID for GPS, etc. The process then stores the extracted characteristics of the received signals and their corresponding identifications of signal sources in the mobile device's memory. The mobile device's memory may include magnetic disks, optical disks, random access memory, read only memory, flash memory devices, etc.

Process 1000 then determines (at 1015) whether the mobile device or a network server is going calculate the position of the mobile device. That is, the process determines whether the position module runs on the mobile device or on the network server. The position module is used to compare the mobile device's channel characteristics with those in the reference database in order to find the mobile device's position.

When the process determines that the position module is not running on the mobile device (i.e., when the process determines that the mobile device does not do the position calculation), the process proceeds to 1035 which will be described below. Otherwise, the process determines that the position module is running on the mobile device (i.e., the process determines that the mobile device does the position calculation). Then the process accesses (at 1020) the reference database which stores signal characteristics. In some embodiments, the process directs a local server of the mobile device to make a wired or wireless connection using cellular, public hotspot WLAN, other wireless method to a networked server and after authentication requests and downloads a subset of the data from the tables stored in the centralized reference database. Since the approximate location of the mobile device is known from prior position calculations or from the beacon signals and cell tower signals the mobile devices receive, only the signal characterization data measured at the coordinates near the approximate location of the mobile device are retrieved.

Next, the process calculates (at 1025) the mobile device's position using interpolation (or extrapolation) and matching. An exemplary interpolation technique that the process uses in some embodiments is described above by reference to FIG. 9. Since there are potentially several types of radios, and several characterization parameters for any given channel, there are different procedures to calculate a position. In some embodiments, the process picks a particular radio (e.g., 802.11), finds the position using each of the available channel characteristics of that radio, and then weights these positions to calculate a final position using that radio alone. The process repeats this procedure for other radio types (e.g., GPS, WiMAX, etc). The calculated positions based on the data for each of those radio types are then weighted. The process calculates a position by averaging the weighted positions to come up with a position of the mobile device. In performing these position calculation using all radios and all channel characteristics, the process in some embodiments may utilize the following pseudo code:

```
For each "radio type"
{
    For each "channel characteristics parameter"
    {
        Calculate position using database interpolation;
    }
    Calculate weighted average position for all "channel parameters";
}
Calculate weighted average position for all "radio types";
```

The procedures represented by this pseudo code are described in detail further below by reference to FIG. 11.

In some embodiments, the weights used in averaging calculated positions of a given radio using different channel characteristics can be based on the reliability and accuracy of given characteristics. For example, when the accuracy of position calculation using channel FFT coefficients are higher than calculations using other characteristics, the calculated positions using channel FFT coefficients are given a higher weights. Calibration experiments can be carried out where the position of the mobile device is known and the calculated positions of the mobile device (using different signal characteristics of a given radio type) are compared to its known position. This can lead to appropriate weights for different channel characteristics.

Likewise, in some embodiments, the weights used in averaging calculated positions using different radio types can be based on the reliability and accuracy of each radio. For example, if the WLAN radios provide better positioning accuracies than GPS radios do, the position calculated based on characteristics of WLAN radio signals are given a higher weight compared to the position calculated based on characteristics of GPS radio signals. Again, calibration experiments with known locations of the mobile device can be carried out to find the appropriate weights for each radio type.

In some embodiments, calculated positions for each radio type are normalized based on the sensitivity levels to improve accuracy of position calculation. A sensitivity level is the minimum received signal power required to find channel characteristics and/or to decode signals.

Next, the process filters (at 1030) the calculated location of the mobile device. This operation 1030 is optional. The process filters and smoothes the calculated location of the mobile device based on previous positions of the mobile device. The mobile device can calculate the mobile device's position at various time instances. The process can calculate the velocity of the mobile devices using two or more positions at which position calculations were made and the time the mobile device took to get to one position from another. Velocity information may also be computed from signal amplitude information and Doppler effects. Previous calculated positions and velocity information can be used to filter and smooth the position calculated using interpolation. This smoothing mechanism can further reduce positioning errors. The filtering algorithms may be simple algorithms like linear 1-tap filters in some embodiments. In other embodiments, the more complex algorithms such as Kalman filtering are used. The process then proceeds to 1055 and 1060 which are described below.

When the process determines that the position module is not running on the mobile device (i.e., when the process determines that the mobile device does not do the position calculation), the process transfers (at 1035) the extracted channel characteristics data from the mobile device to a network server. Then the process accesses (at 1040) the reference database by the network server to obtain signal characteristics stored in the database as described above for the operation 1020. The process downloads a subset of the data from the centralized reference database. The process calculates (at 1045) the mobile device's position by the networked server using interpolation and matching techniques as described above for the operation 1025. The process then optionally filters (at 1050) the calculated position or location of the mobile device by the network server's position module and sends the filtered position back to the mobile device. In some embodiments, the process may send the position information to the mobile device without filtering the position information.

The process then optionally reports (at 1055) database inconsistencies to the network server so that the server corrects or initiates correction of data stored in the reference database. In some embodiments, the process flags the inconsistencies to the networked server. After the process calculates the location of the mobile device, the process compares the measured channel characteristics data with those stored in the reference database and notify the networked server if there are inconsistencies found. The inconsistencies between the measured data and stored data can be caused when some previously existing transmitters that were transmitting radio signals to the location of the mobile device are removed, new transmitters are added and transmit additional signals to the location, new buildings are built and obstruct signal paths, previous existing buildings are demolished and no longer block or reflect signals. Then the networked server can modify the centralized database entries or send a service request to the moving scanner to scan that area again in order to update the database.

The process may also optionally use (at 1060) the calculated position for navigation. The process may pass the calculated position information to a navigation module that uses the calculated position for navigation purposes. This module superimposes the calculated position onto a map and provides navigational features such as giving directions and displaying points of interest. The process then ends. It should be appreciated that process 1000 does not use triangulation when determining the location of the mobile device.

One of ordinary skill in the art will recognize that the specific operations of process 1000 may not be performed in the exact order shown and described. The specific operations may not be performed in one continuous series of operations, and different specific operations may be performed in different embodiments. Furthermore, the process could be implemented using several sub-processes, or as part of a larger macro process. In addition, some operations can be done by a network serve while other operations can be done by a mobile device. For instance, in some embodiments, operations 1005-1030 and 1055-1060 are performed by the mobile device while other operations are performed by another device (such as a server). One of ordinary skill in the art will recognize that other combinations for perform operations of process 1000 by the mobile device and a remote device are also possible.

Figure 11:
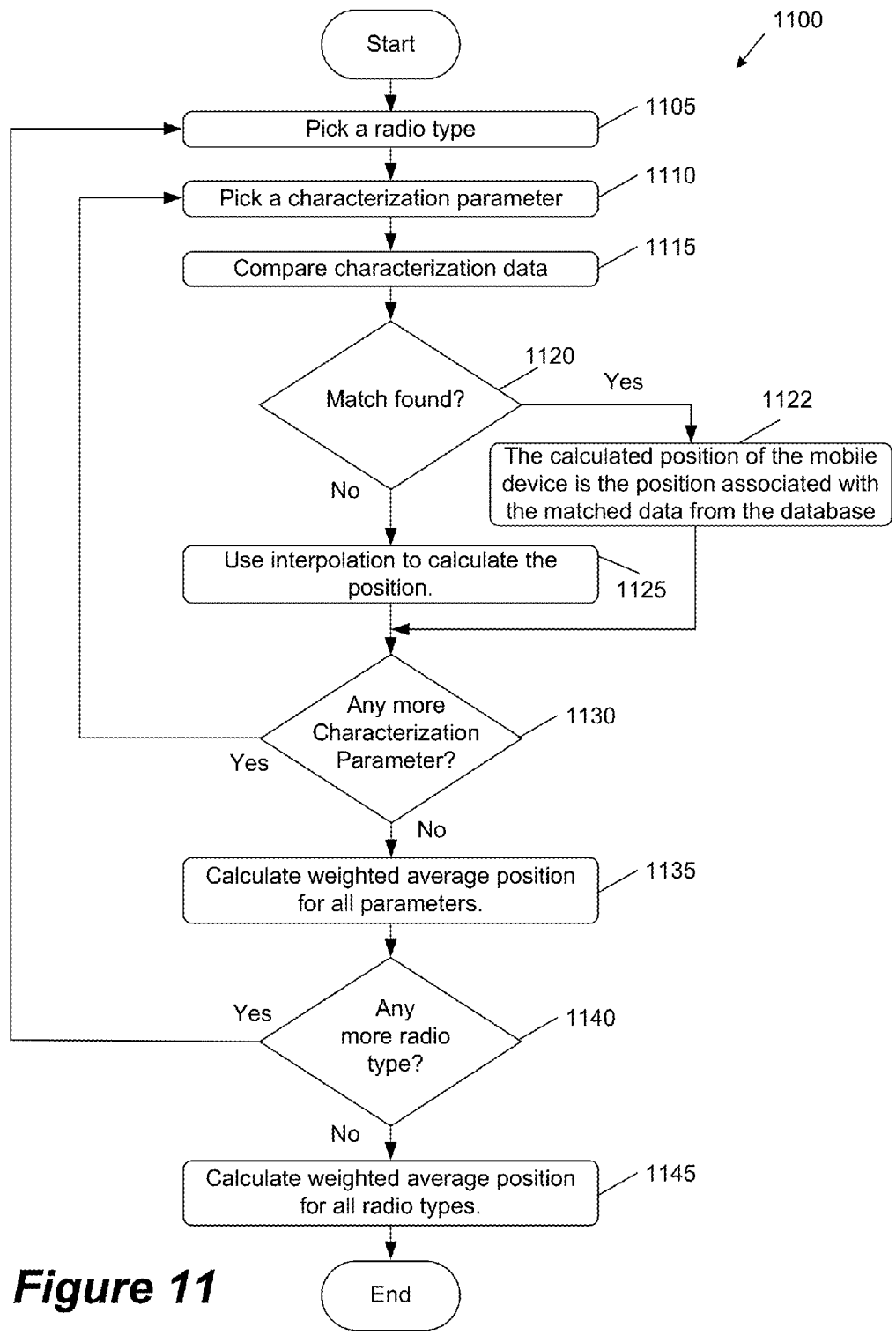
FIG. 11 conceptually illustrates a process that some embodiments use to calculate the position of a mobile device.

FIG. 11 conceptually illustrates a process 1100 performed by a position module such as position module 805 described above by reference to FIG. 8. Specifically, FIG. 11 illustrates in detail position calculations performed by a position module in some embodiments using matching and interpolation. In some embodiments, the position module can reside on a mobile device of which the position is to be determined. In other embodiments, the position module is on a network server. In different embodiments, the position module may reside on any other server that the mobile device or the network server can communicate with.

In some embodiments, process 1100 starts when the position module has extracted characteristics of all the signals received by all of the mobile device's radio receivers. The position module has characterized each received signal using one or more signal characterization parameters such as channel FFT coefficients, time of arrival delay using preamble correlation, beacon signal strength, etc. The position module has performed extraction of characteristics for all radio types which include GPS, cellular, WLAN 802.11, Bluetooth®, WiMAX, HD Radio™, UWB and 60 MHz, etc. In addition, the position module has accessed a reference database and retrieved characterization data stored in the database.

As shown, process 1100 initially picks (at 1105) a radio type (e.g., 802.11) to calculate position of the mobile device using the extracted data and the retrieved data of signals of the type. Then the process picks (at 1110) a characterization parameter (e.g., channel FFT coefficients) to calculate position of the mobile device. In some embodiments, the mobile device does not include a cellular radio (e.g., a PCS or media player) but the mobile device is capable of communicating in short range by using a short range radio such as WLAN, Bluetooth, UWB, etc. In some embodiments, the mobile station is able to communicate via cellular and a short-range radio. Some embodiment utilize process 1100 and other techniques disclosed in this specification to locate a mobile device when the mobile device is in an indoor place where cellular connectivity is weak or is not available (such as a building or a mall) or when the mobile device is in an outdoor location where cellular connectivity is weak or is not available (e.g., inside a tunnel or urban canyons). In addition, short-range access points (where the range of the access point is less than 1000 feet) are low-cost, wide available, and closely placed. In contrast, cellular towers are aimed at medium and long-range communication and are typically several miles away from each other.

Next, the process compares (at 1115) the characterization data extracted at the mobile device's position with the characterization data of the positions retrieved from the database to find a match among the retrieved data. In some embodiments, the characterized data stored in the database include a timestamp. For instance, when the characterized data were collected from a time varying source (such as an orbiting satellite), the signals are collected from the time varying source and the extracted parameters are stored in the database with a timestamp (e.g., time of day). In some embodiments, process 1100, compares the characterization data extracted from the mobile device's position with characterization data retrieved from the database that has a timestamp close to the time that the mobile device's characterization data is collected (e.g., a close time of day timestamp). In other embodiments, several values from the database are weighted based on proximity of their timestamps to the time that the mobile device's characterization data is collected in order to provide a value to compare with the Mobile device's characterization data.

Next, the process determines (at 1120) whether there is an exact match. When the process determines that there is an exact match, the process determines (at 422) the calculated location of the mobile device (for the picked parameter and radio type) as the location information or position associated with the matched data. The process then proceeds to 430 which is described below. Otherwise, the process calculates (at 1125) the position of the mobile device using interpolation or extrapolation. An exemplary interpolation technique is described above by reference to FIG. 9.

Next, the process determines (at 1130) whether there is any other parameter to use in calculating the position of the mobile device. The process goes through the parameters used to extract characteristics of the received signals as well as the parameters used in the characterization data retrieved from the reference database. To use a parameter, it must exist in both the extracted data and retrieved data.

When the process determines that there still is a characterization parameter available to use, the process returns to 1110 to pick that parameter and uses it to calculate the position of the mobile device. Otherwise, the process calculates (at 1135) the weighted average position for all channel characterization parameters. As described above by reference to FIG. 10, the weights used in some embodiments in averaging the calculated positions are based on the reliability and accuracy of given characteristics. This average position is the position calculated for the picked radio type.

The process then determines (at 1140) whether there are signal characteristics of other radio types. The process goes through both the extracted and retrieved data to see if a radio type existing in both data has not been used yet to calculate the position of the mobile device. To use the signal characteristics of a radio type, the radio type must exist in the extracted data and retrieved data.

When the process determines that there still is a radio type of which the signal characteristics are yet to be used in position calculation, the process returns to 1105 to pick that radio type to perform calculation. Otherwise, the process calculates (at 1145) the weighted average position for all radio types that the process has used to calculate the position. This average position is the position calculated using all available characterization parameters and radio types. The process then ends.

The specific operations of process 1100 may not be performed in the exact order shown and described. The specific operations may not be performed in one continuous series of operations, and different specific operations may be performed in different embodiments. Furthermore, the process could be implemented using several sub-processes, or as part of a larger macro process, for example, process 1000 described above by reference to FIG. 10.

IV. Alternative Embodiments to Populate Channel Characteristics Database

As described above, a moving scanner equipped with radio receivers goes around different locations in an area of interest and characterizes signals that it receives to populate a centralized reference database in some embodiments. In other embodiments, instead of having a moving scanner perform signal characterization at different locations, fixed radios that are installed at known coordinates in the areas of interest (e.g. GPS for outdoor urban or downtown areas, WLAN for indoor locations and tunnels, etc.) characterize signals that they receive and populate the reference database. In these embodiments, the need for a moving scanner is eliminated.

Figure 12:
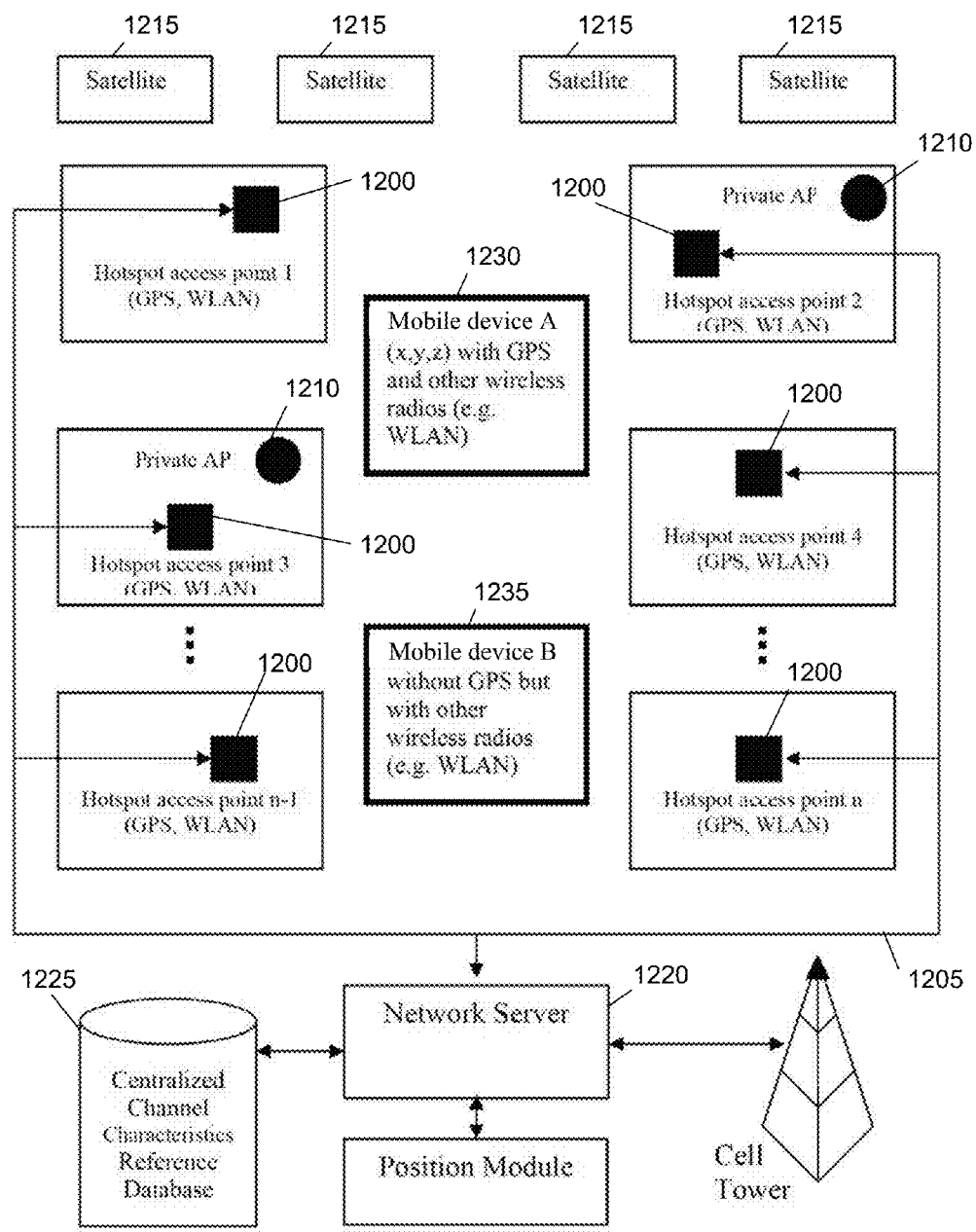
FIG. 12 conceptually illustrates the use of fixed radios instead of moving scanners in some embodiments.

FIG. 12 conceptually illustrates the use of fixed radios instead of moving scanners in some embodiments. As shown, public hotspot access points 1200 with both GPS and WLAN transceiver radios are installed at known coordinates on posts and buildings and connected to a network backbone 1205 either wirelessly or through wires. FIG. 12 also illustrates private access points 1210 that send out beacon signals and whose channels can be characterized. Unlike the public access points 1200, these private access points 1210 in some embodiments are not used for transmitting those data to populate a reference database. In other embodiments, private access points can be used for signal characterization and data transmission, with permission or agreement by the provider or owner of the access points.

To implement those embodiments where public hotspot access points installed at known coordinates collect signal characterization data and populate a reference database, the service providers, such as AT&T™, which already provide WLAN access points for hotspot areas, would need to add GPS capability to the access points that they operate. While hotspot access points 1200 illustrated in FIG. 12 have only GPS and WLAN radios, one of ordinary skill in the art would realize that the access points can have other types of radios such as Bluetooth®, WiMAX, HD Radio™, UWB, 60 GHz and cellular to receive radio signals of those types. Also, these radios are added to existing access points to enable the access points to characterize signals and populate the reference database. However, these radios can be installed at new locations where there are no access points installed previously so that there are more measurements points in the area of interest in addition to the access points locations. These radios can also be installed at cell towers so that the cell towers can characterize different types of radio signals and populate the reference database.

The GPS-equipped access points in some embodiments receive GPS signals from satellites 1215 and characterize the GPS channels at their locations. Thereby the access points in these embodiments effectively perform the same function as a moving scanner which characterizes GPS or other radio signals it receives at grid sampling points within an area of interest as described by reference to FIG. 5 above. The locations of these access points 1200 are effectively the grid sampling points illustrated as locations marked with X's in FIG. 5.

In some embodiments, the GPS transceivers of the public access points 1200 illustrated in FIG. 12 communicate with the satellites 1215 that they see, characterize their channel characteristics (e.g., delay, phase, range to satellite, their IDs, etc.) at different time instances, and transmit the characteristics to a network server 1220. In these embodiments, the network server 1220 processes the channel characterization data it received from the access points 1200 further before storing the time, channel characteristics and position coordinates in a centralized reference database 1225.

In some embodiments, the access points equipped with GPS perform the signal characterization on a continuous basis with the access point's GPS always running. In other embodiments, the signal characterization is performed when a mobile device such as mobile device A 1230 is nearby the access points and requires positioning information from the access points. In these embodiments, the access points' WLAN radios send out beacon signals that mobile device A's WLAN receiver can detect. Likewise, mobile device A's WLAN radio can send beacon signals that the access points' WLAN receiver can detect. Thus, mobile device A 1230 and the access points 1200 know about each other's presence.

In some embodiments, the public GPS-equipped access points 1200 also provide the mobile device 1230 with assistance data such as satellite ID, almanac, clock correction, ephemeris, approximate time, and approximate location. Passing these assistance data from the access points 1200 to the mobile device A 1230 ensures that the access points 1200 and the mobile device 1230 see the same satellites and experience similar multipath and channel characteristics. For example, when public access point 1 1210 detects mobile device A 1230 by receiving wireless beacon signals from mobile device A 1230, the access point tells the mobile device which satellite to look at.

In some cases, some of the access points 1200 illustrated in FIG. 12 may also need assistance data if they are stationed indoors or if they receive weak satellite signals. In such cases, the network server 1220 or one of the nearby access points that receive signals from satellites 1215 can provide those access points with assistance data such as satellite ID, almanac, clock correction, ephemeris, approximate time, and approximate location.

FIG. 12 also illustrates other embodiments of the invention where, instead of having a moving scanner perform signal characterization at different locations as described above by reference to FIGS. 4 and 5, signal characterization is performed by another kind of a moving scanner, a position-enabled mobile devices with communication radios (e.g., mobile or hand-held devices moved around by humans on sidewalks or inside malls). In these embodiments, a multi-radio mobile or hand-held device uses one radio (e.g., a GPS) to compute its position and uses another radio (e.g., WLAN) to characterize and populate the reference database for that radio at that position.

In these embodiments, mobile device A 1230 illustrated in FIG. 12 first uses its GPS radio to find its position, and then uses its WLAN radio to characterize the WLAN radio channels it sees in order to populate the reference database. Using its GPS radio to find its position first is different from some embodiments described above by reference to FIG. 10 where all of the different radio types of a mobile device are used to characterize signals in order to calculate the position of the mobile device by comparing the characterization data with the data stored in a reference database. While it is certainly possible that mobile device A use both its GPS and WLAN radios to characterize signals and locate mobile device A by comparing characterization data, in these embodiments mobile device A's GPS radio is used to compute mobile device A's position on its own and mobile device A's WLAN radio is used to characterize the WLAN signals and populate a reference database with the characterization data. The signal characterization data stored in the reference data are then used by mobile devices such as mobile device B 1235 that does not have a GPS to find its location on its own. Mobile device B will characterize the signals it received via its WLAN radio and characterize the signals first. Mobile device B will then compare the data with mobile device A's signal characterization data stored in the database in order to obtain its location information.

Mobile device A 1230 can employ several different methods to calculate its position. In some embodiments, mobile device A's GPS communicates with the satellites 1215 to compute its position. However, if mobile device A experiences significant multipath and fading in receiving signals from the satellites, the calculated position can be inaccurate.

In other embodiments, mobile device A characterizes its GPS channels with each satellite it sees. Interpolation and matching of mobile device A's GPS channel characteristics with the reference GPS channel characteristics is used to locate mobile device A. In these embodiments, either the mobile device A's position module accesses the reference database and does the calculations or the mobile device transfers its channel characteristics to a network server using hotspot WLAN, cellular or other connectivity mechanisms and the server's position module calculates the mobile device's position. This position calculation in these embodiments is more accurate than the position calculation done by mobile device A's GPS alone because the calculation is done by comparing its signal characterization data with the data measured by nearby GPS-equipped access points of which the accurate positions are known and mobile device A experiences similar multipath and fading that these nearby GPS transceivers experience.

In different embodiments, the fixed location GPS transceivers of the access points illustrated in FIG. 12 act as differential correction references. These transceivers communicate with the satellites, compute their coordinates, and then compare their GPS computed coordinates with their known fixed coordinates to find errors for each satellite. They then provide differential correction data to other GPS transceivers such as mobile device A 1230. In some embodiments, mobile device A 1230 can use the differential correction data from the nearest access point. In these embodiments, mobile device A finds the nearest access point based on the signal power, i.e., the access point showing most signal power to mobile device A is considered nearest to mobile device A. In other embodiments, mobile device A takes differential correction data from a number of nearby access points and uses them after weighting the data based on signal power that mobile device A receives from each the access point.

After mobile device A 1230 calculates its position with GPS, it can use its WLAN radio to characterize other WLAN radio communication channels that are present at that position such as the channels of the access points. Mobile device A 1230 can transmit to the access points or the access points can transmit to mobile device A. It should be noted that both downlink and uplink channel characterizations are possible. When mobile device A and an access point use the same frequency band and each use a single antenna, characterization with access point transmitting and mobile device A receiving should give the same results as mobile device A transmitting and the access point receiving. The processing of the channel characteristics can be performed by the mobile device, the access point, or a network server. The processed characterization data are then uploaded and stored in the reference database 1225. Mobile device A can repeat this channel characterization process at different locations as it moves around the different positions. In some embodiments, other mobile devices equipped with GPS and WLAN radios perform these signal characterization process at different locations (i.e., more than one mobile device can perform characterization process), thereby populating the reference database for the coverage area of the access points and eliminating the need for a moving scanner described above by reference to FIGS. 4 and 5. Implementation of these embodiments where the mobile devices characterizes signals and populate the reference database depends on contribution by the users who uses these mobile devices. That is, the users must direct their devices to characterize the signals or the users authorize the service providers to utilize their devices to characterize the signals at different locations.

In some embodiments, the public hotspot access points 1200 characterize all the WLAN communication channels at their respective locations. For example, public hotspot access point 1 1200 can measure characteristics of its WLAN communication channels between it and all the other public WLAN access points, as well as the channels between it and private WLAN access points 1210. Such channel measurement by the public hotspot access points 1200 can be repeated frequently and the corresponding entries in the reference database are updated accordingly.

Mobile device B 1235 that does not have a GPS but does have a WLAN radio uses its WLAN radio to locate its position in the hotspot area by characterizing the WLAN signals it receives and comparing the characterization data with those stored in a reference database. For instance, as mobile device B 1235 enters a WLAN hotspot coverage area, it characterizes its WLAN communication channels with the access points. A position module matches the data with channel characteristics stored in the reference database to find mobile device B's position. In some embodiments, the position module runs on mobile device B 1235. In other embodiments, the position module runs on the network server 1220. In a commercial setting, a service provider that is providing the wireless hotspots may provide the network server, the reference database, and the positioning module as a service.

V. Multiple Antenna Systems

As described above, some embodiments of this invention rely on characterization data of signals that propagate in multipath to achieve positioning accuracy. In some cases, however, signals do not propagate in multipath (e.g., an environment where there are not enough obstacles and reflectors to cause the signals to reach the receivers in multipath). In other cases, the channel profile of an access point at a certain location only has a direct line of sight propagation with one peak or one multipath peak. In these cases the profile cannot contribute to the proposed methods of position calculation of the invention. In such cases, some embodiments of the invention use Multiple Input Multiple Output (MIMO) systems that have multiple antennas to generate a multipath profile signature. FIG. 13 conceptually illustrates an example of a system that uses multiple antennas to generate multipath in some embodiments. Specifically, FIG. 13 shows an access point 1300 and two receivers (e.g., mobile devices) 1310 and 1315. The access point in this example has four antennas 1305. In some embodiments, antennas 1305 transmit signals at the same time. In other embodiments, antennas 1305 transmit signals close together in time with a known time separation pattern. In some embodiments, MIMO systems add cyclic delays even for the transmitters that are meant to transmit at the same time.

Each mobile receiver receives the superposition of the four waves received from each access point antenna. However, since the antennas 1305 are separated in space, the waves travel different distances to reach the mobile receiver. Thus, the waves arrive at different times partially as a result of traveling different distances and partially as a result of any transmit time differences between the antennas 1305, thereby creating a profile that resembles a multipath profile. Each antenna transmitting separately represents a separate channel. Thus the waveform received at the receiver can be viewed as a multi-channel profile.

FIG. 14 conceptually illustrates two graphs 1410 and 1415 that illustrate the multichannel profiles created as a result of the separation of the antennas at positions $(x_1,y_0,z_0)$ and $(x_2,y_0,z_0)$ respectively. If the transmit time separation between the antennas 1305 of the access point 1300 is fixed for different positions of mobile devices (e.g., at mobile position $(x_1,y_0,z_0)$, antenna 2 transmits 100 ms after antenna 1, antenna 3 transmits 100 ms after antenna 2, etc, and at mobile position $(x_2,y_0,z_0)$ antenna 2 transmits 100 ms after antenna 1, antenna 3 transmits 100 ms after antenna 2, etc.), the shape of the multichannel profile and the position of the peaks in the multichannel profile of the waves that the mobile receivers 1310 and 1315 receive are dependent on the position of the mobile device, as illustrated in graphs 1410 and 1415 of FIG. 14. For example, the waves from the antennas 1305 arrive at the receiver 1310 at different times because the waves travel different distances to reach the receiver 1310. Transmissions from antennas that are further away from the receiver travel greater distances and as a result arrive at later times with smaller amplitudes. In free space, signals experience free space loss, where the received power is proportional to $1/d^2$ where d is the distance between the transmitter and the receiver. Likewise, the multichannel profile 1415 at position $(x_2,y_0,z_0)$ that is further away from the antennas 1305 than $(x_1,y_0,z_0)$ shows four peaks, but the peaks arrive with smaller amplitudes and at later times than the peaks of the multichannel profile at position $(x_1,y_0,z_0)$ as illustrated in graphs 1410 and 1415. Also since the mobile is at a more oblique angle at 1315 than at 1310 and hence waves from more distant antennas have further to travel, the four peaks in graph 1320 are more separated in time compared to the peaks in graph 1315 for the multichannel profile at position $(x_1,y_0,z_0)$.

While FIG. 13 illustrates an embodiment that uses a MIMO access point, other embodiments have a single-antenna access point and MIMO receivers. Yet other embodiments have MIMO access points and MIMO receivers. In some embodiments, when the mobile device has multiple receiver antennas, the location of each mobile device antennas is separately determined using any of different disclosed methods. Thus, each mobile antenna is treated as an independent channel and there are multiple peaks as a result of obstacles and/or as a result of the access point having multiple antennas. The location of the mobile device is then determined based on the location of the mobile device antennas (e.g., as a weighted average of the location of each mobile device antenna). If the access point has only one antenna transmitting to a mobile that has multiple antennas, and there are no obstacles to generate multiple peaks then the scanner's radio that populates the database must have the same antenna configuration as the mobile.

As describe above, the access point antennas can transmit at preset different times which manifest themselves at the receiver as fixed additional delays for each antenna path. Then, in these embodiments where there are MIMO transmitters and/or MIMO receivers, the environment is scanned and the characteristics of the communication channels are stored in a reference database. The only difference between these embodiments and the embodiments where the multipath profiles are experienced because of the obstacles and reflectors is that the communication channels are MIMO. As described above by reference to FIG. 2, reflections from obstacles created multipath waves that could be viewed as originating from virtual transmitters. In the example illustrated in FIG. 13, there are no obstacles to create multipaths. Instead, spatially separated antenna transmitters 1305 create the multichannel profiles that can be viewed as multipath profiles.

In some embodiments, MIMO systems are used in environments where there are obstacles that cause reflections and multipaths. In some embodiments, each antenna transmits separately and the receiver receives each antenna transmission separately. Then in these embodiments each antenna of a MIMO transmitter can be treated as a separate transmitter with a separate location like the transmitters described above by reference to FIG. 2, and the antennas effectively improve the accuracy by providing more channel characteristics data such as those illustrated in FIG. 3. In other embodiments, the antennas of a MIMO system transmit together and there are also reflectors causing multipaths. When the antennas transmit together, some embodiments characterize the signals from all transmitters of a MIMO transmitter as a single transmission channel. In these embodiments, the channel profile of the MIMO transmitter provides even more peaks (some due to the multiple antennas and some due to reflections), which increases the accuracy of some embodiments of this invention. These embodiments are in effect a combination of the embodiments illustrated in FIG. 2 and the embodiments illustrated in FIG. 13.

VI. Extracting Channel Characteristics for Wlan 802.11 Signals

This section uses the wireless LAN IEEE 802.11a standard to demonstrate some methods of how to extract some of the channel's characteristics such as the multipath profile, channel FFT coefficients, time of arrival delay using preamble correlation, and time of arrival delay using RSSI transition in some embodiments. However, one of ordinary skill in the art would realize that the disclosed methods can be applied to any system that has a preamble structure such as Bluetooth®, WLAN, cellular (2G, 3G, 4G), WiMAX, HD Radio™, UWB, and 60 GHz standards. The proposed methodology works as long as both the transmitter and receiver use the same standard.

FIG. 15 illustrates the frame format in the 802.11a standard. As shown, the frame includes a Physical Layer Convergence Protocol (PLCP) Preamble field 1505 (which includes 12 symbols), a SIGNAL field 1510 (which includes one OFDM symbol) and a Data field 1515 (which includes a variable number of OFDM symbols). The LENGTH and RATE of the Data symbols are included in the SIGNAL field and are required to decode the DATA symbols. The standards document describes these fields in detail.

FIG. 16 illustrates the OFDM training structure in more detail. As shown, the PLCP preamble field 1505 includes 10 short training sequences followed by a guard interval and two long training sequence. As shown, $t_1$ to $t_{10}$ denote short training symbols, GI2 denotes the guard interval, and $T_1$ and $T_2$ denote long training symbols. The PLCP preamble 1505 is followed by the SIGNAL field 1510 and DATA 1515. The total training length is 16 µs.

The short training sequence can be used for Automatic Gain Control (AGC), diversity selection, timing acquisition, and coarse frequency acquisition. The long training sequence can be used for channel estimation and fine frequency acquisition. In some embodiments, channel estimation is used to calculate the time elapsed from the frame boundary corresponding to the earliest path from a transmitter to a receiver. Initially, some of the 10 short preamble sequences are used for AGC, frequency and time estimation and the remaining are used for time correlation. These remaining short preambles give coarse timing synchronization and narrow the range of correlation. The phase of the correlation evaluated at the peak also gives the coarse frequency estimate. Then the correlation of the long sequence gives a multipath profile such as the one illustrated in FIG. 3. The multipath profile represents the channel characteristics and can be stored in a database table. The earliest delay peak determined through this correlation corresponds to the direct line of sight distance between the transmitter and receiver. When there is no line of sight, the correlation peak corresponds to the shortest multipath. All the peaks' amplitudes, phases and time of arrivals of the multipath profile can also be extracted as illustrated in FIG. 3 and stored in a database table such as table 605 illustrated in FIG. 6.

Figure 17:
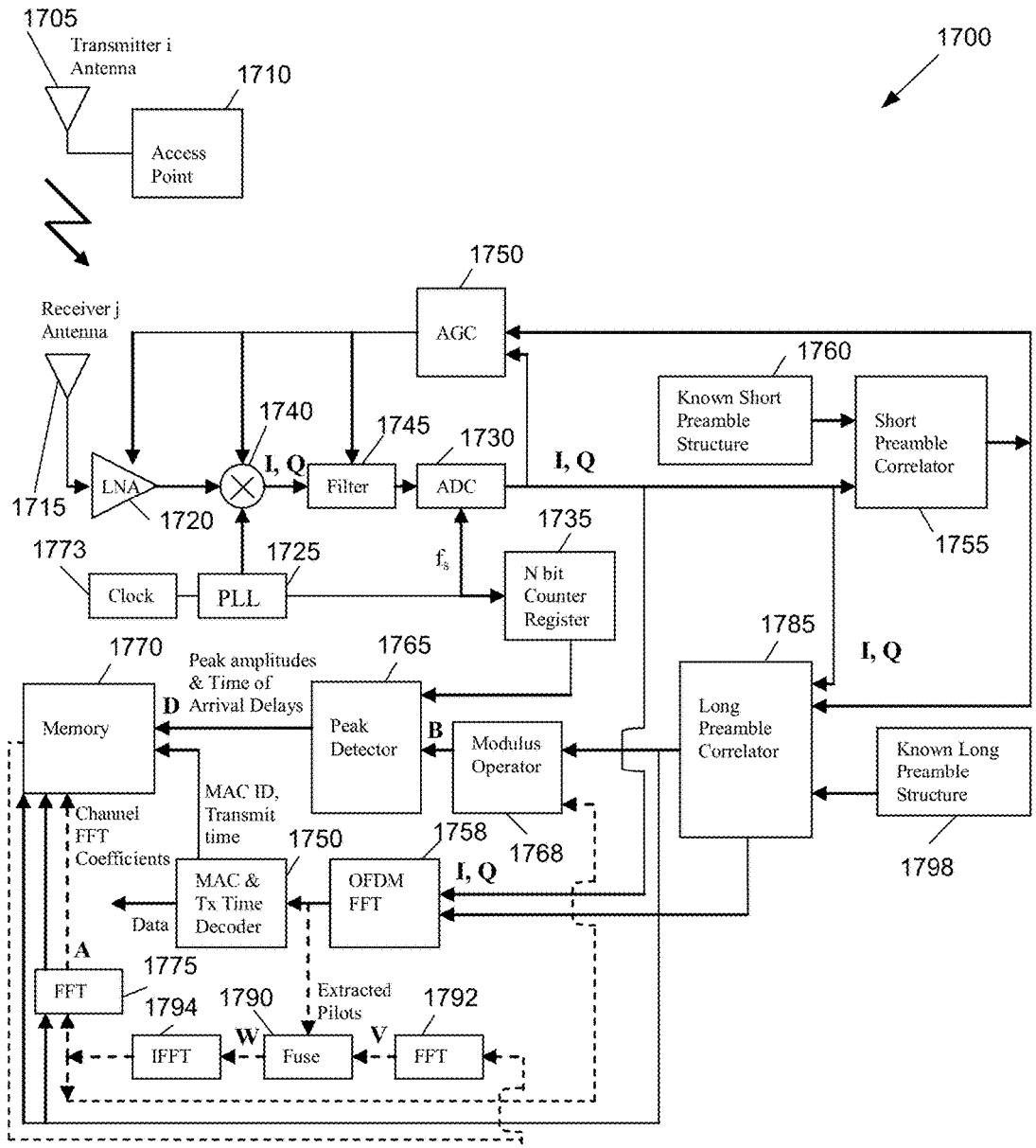
FIG. 17 conceptually illustrates a system of some embodiments that uses the known transmission pattern of the training structure to determine the time delay between a transmitter base station and a mobile receiver.

FIG. 17 conceptually illustrates a system 1700 of some embodiments that uses the known transmission pattern of the training structure to determine the time delay between a transmitter base station and a mobile receiver. As shown, system 1700 includes a transmitter 1705 and a mobile device's receiver 1715. An example of mobile device's receiver is an 802.11a receiver. One of ordinary skill in the art would realize that specific details of FIG. 17 are given as an example and it is possible to use different circuit implementations to achieve the same results without deviating from the teachings of the invention. Furthermore, the example of FIG. 17 uses the wireless LAN IEEE 802.11a standard to demonstrate methods of how to extract some of the channel's characteristics such as the multipath profile, channel FFT coefficients, time of arrival delay using preamble correlation. However, one of ordinary skill in the art would realize that the disclosed methods can be applied to any system that has a pre-amble structure such as Bluetooth®, GPS, WLAN, cellular (2G, 3G, 4G), WiMAX, HD Radio™, UWB, and 60 GHz standards. The proposed methodology works as long as both the transmitter and receiver use the same standard.

As shown, the receiver's baseband calculates a channel's multipath profile (see Marker B in FIG. 17), channel's FFT coefficients (see Marker A in FIG. 17), and time of arrival delay using preamble correlation (see Marker D in FIG. 17). The receiver's baseband uses correlation with the preamble training structure to calculate the channel's multipath profile and uses FFT to transform it into the channel's FFT coefficients. In this example the receiver employs direct conversion where the carrier frequency is directly converted to two baseband signals; in-phase I and quadrature Q, which are then sampled by Analog-to-Digital-Converters (ADC) (see Markers I and Q in FIG. 17). The method, however, applies to other receiver architectures too, such as heterodyne or super heterodyne, where an ADC is used to sample the full signal bandwidth of interest.

The antenna 1705 of the access point 1710 transmits an RF waveform. The antenna 1715 of the receiver j receives the RF signal after a delay corresponding to the distance between the two. The Low Noise Amplifier (LNA) 1720 amplifies the received RF signal without increasing the noise level. A Phase Lock Loop (PLL) 1725 generates a clock for down conversion as well as the clock ($f_s$) to sample the analog signal at the Analog to Digital Converter (ADC) 1730 input. The PLL 1725 clock is also used for an N bit counter register 1735 that stores time delays. This register counts from 0 to (2N−1) and then wraps around back to zero. Therefore, the size of this register, N, should be large enough to represent the time delays that are expected so that time wrap around can be avoided. It should be noted that once the counter wraps around to zero, that portion of the time delay is lost. For instance, when the counter only goes up to 100 ms, a time delay of 115 ms will show up as 15 ms in the counter. When T is the largest time delay that is expected, the counter should be designed to be larger than T plus a delta, where delta is the maximum expected time offset error. The transmitter also has a counter that is synchronized with the counter of the receiver through calibration transmissions. When the non-synchronous approach of shifting the channel multipath profiles to the position of the first peak as described above is used, there is no need for the counters or for their synchronization.

The mixer 1740 uses the RF output of the LNA 1720 and the PLL 1725 signal to down convert the RF signal for baseband. The down-converted signal is a complex signal with in-phase (I) and quadrature (Q) components (see Markers I and Q in FIG. 17). The filter 1745 rejects unwanted signals. The ADC 1730 digitizes the signal. A time tracking loop is run so that the ADC sampling points are synchronized with the transmitted waveform. This means that the sampling points are identical and hence avoids interference between symbols (Inter-Symbol Interference or ISI). The amplitude of the ADC 1730 output may be used for Automatic Gain Control (AGC) 1750 so that front-end RF block settings are adjusted and the ADC output captures the main signal. The short preamble correlator 1755 correlates its input signal with the signature of the short preamble received from known short preamble structure source 1760 and its output adjusts the gain control settings. After the short preamble correlation is complete then the correlation with the long preamble structure is carried out.

Referring back to FIG. 16, the long preamble consists of two preamble symbols, $T_1$ and $T_2$. The short pre-amble correlator 1755 also provides a coarse time estimate for the sliding window of the long preamble correlator 1785, so that the correlation window starts just before $T_1$. The long preamble correlator 1785 can correlate the I and Q received signal components against both $T_1$ and $T_2$ together (by using the signature of the long preamble received from known long preamble structure source 1798). This is a complex correlation and the output of the long preamble correlator 1785 therefore is a complex signal with real and imaginary components. The complex output of this correlator can in some embodiments be stored in memory to represent channel FFT coefficients, or be used together with extracted pilots to calculate more accurate channel FFT coefficients. A modulus operation is then carried out (by the modulus operator 1768) on the output of the long preamble correlator where the absolute value magnitude of the complex signal is calculated. The magnitude of the output of the long preamble correlator 1785 is marked B in FIG. 17.

Figure 18:
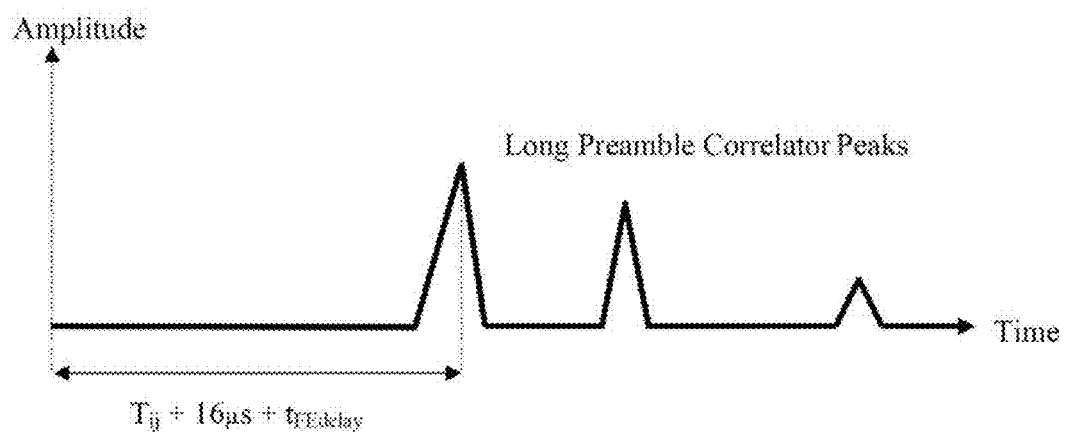
FIG. 18 conceptually illustrates magnitude output of a long preamble correlator of some embodiments.

FIG. 18 conceptually illustrates (similar to FIG. 3) magnitude output of a long preamble correlator of some embodiments. Tij denotes the time for the RF wave to travel from the transmitter's RF antenna i 1705 to the receiver's RF antenna j 1715. The transmitter's and receiver's front-end RF components (antenna, LNA, filter, ADC) introduce an additional delay, $t_{FEdelay}$, before the signal reaches the long-preamble correlator 1785. This delay has a mean value with a small deviation for a given hardware. Therefore, the delay is treated as a constant in some embodiments. Also, the long preamble signal introduces an additional fixed delay of 16 µs since it has to wait for the arrival of both $T_1$ and $T_2$ before performing the correlation (8 µs for the first 10 short preambles, 1.6 µs for the guard interval, 3.2 µs for $T_1$ and 3.2 µs for $T_2$. It should be appreciated that when the correlation is done only against $T_1$, there is no need to wait for $T_2$. However, using both $T_1$ and $T_2$ increases the signal to noise ratio and improves the accuracy of the peak detection). Thus the location of the correlator's first peak corresponds to ($T_{ij}$+16 µs+$t_{FEdelay}$), which is travel time delay $T_{ij}$ subject to a fixed offset. The amplitude of the peaks and the value of the counter register 1735 corresponding to the location of the peak is stored in memory 1770.

After a time delay that is a system parameter, the system performs FFT on the OFDM signal symbol. The MAC address (i.e., MAC ID) of the received RF signal, which is in the SIGNAL symbol, is computed with an OFDM FFT 1758 and a MAC and transmission time decoder (Mac & Tx time decoder) 1750. The OFDM FFT 1758 uses the output of the long preamble correlator 1785 in order to determine when to start the FFT. The OFDM FFT also discards the cyclic prefix. The MAC address is then saved in memory 1770 so that stored time delays correspond to a particular access point's MAC address. The transmission time, represented by the transmitter's counter value at transmission, can be stored in the SIGNAL symbol. Mac & Tx Time decoder 1750 also retrieves the transmission time with an FFT and stores it in memory 1770. The difference between the transmitter's counter value at transmission and the receiver's peak detection counter value represents time of arrival plus system delays and synchronization offsets (which may be calibrated and compensated for). The data is also decoded with an equalizer (equalizer details are not shown in FIG. 17) which uses the channel coefficient estimates to do division and multiplication in the FFT domain to decode the data. In some embodiments, the correlators do not have to run all the time and may go to sleep once the peak detector finds the first peak.

In 802.11 WLAN OFDM implementation, four of the subcarriers are dedicated to pilot signals. A total of 52 subcarriers are used where the pilots are inserted at positions −21, −7, 7 and 21. The remaining 48 positions are used for data and contain no channel information. Having these pilot signals inserted at those positions makes coherent detection robust against frequency offset and phase noise. The pilot signals are modulated by a pseudo binary sequence to prevent the generation of spectral lines. If packet sizes are long then the channel can change and one can use these pilots to update channel and time delay estimates. The pilots go through the channel and provide one measurement of the channel at their positions. The long preamble also goes through the channel and is then correlated with the original preamble structure. The output of the long preamble correlator 1785, therefore, provides a second measurement of the channel at the pilot positions.

Referring back to FIG. 17, some embodiments optionally (shown with the dashed arrows) extract the pilots by an FFT and use them to improve the channel estimate and update the peak detector's output. To do this the extracted pilots are fused (by the fuse component 1790) with the FFT (calculated by FFT module 1792) of the previously stored long preamble correlator 1785 output. This fusion step involves using weights to change the values of the FFT of the long preamble correlator 1785 output at the pilot locations. The result then goes through an inverse FFT (IFFT) 1794 step and the improved estimates are then fed back to modulus operator 1768 and peak detector 1765. Channel FFT coefficients are calculated by FFT module 1775 and stored in memory 1770.

A. Preamble Correlation and Pilot Channel Estimate

The following description uses an example where OFDM uses 52 frequency subcarriers with 4 pilot subcarriers (−21, −7, 7 and 21) and uses a 64 point FFT/IFFT, where the received signal is in the time domain and the receiver performs FFT to take the signal back into the frequency domain. Typically coefficients 1-26 are mapped to the same FFT/IFFT inputs, coefficients −26 to −1 are mapped to 38-63 FFT/IFFT inputs, and the remaining inputs (27 to 37 and 0) are set to 0. The received signal of a channel is convolution of the input signal with the impulse response of the channel. In the frequency domain this means that the FFT of the received signal is multiplication of the FFT of the input signal with the FFT of the impulse response of the channel. Therefore, the FFT of the received long preamble signal is multiplication of the FFT of the input signal with the FFT of the channel and is expressed by the following equation:

$$FFT \text{ of the received long preamble} = L_m C_m$$

where $L_m$ is the FFT of the transmitted long preamble signal; $C_m$ is the channel FFT; and m is the subcarrier frequency index.

The long preamble correlator convolves the received signal with the conjugate of the long preamble (since the signal is a complex number). The result (shown as Marker V in FIG. 17) is expressed in the following equation:

$$V_m = |L_m|^2 C_m$$

where $m \in [-32, \ldots, 31]$.

The above Equation for $V_m$ gives one estimate of the channel. Suppose that $P_m$ are the transmitted pilots and $P'_m$ are the extracted pilots in FIG. 17. These extracted pilots also provide channel measurements at the pilot locations (indexes m equal to −21, −7, 7 and 21) as expressed in the following equation:

$$P'_m = \sigma \cdot C_m P_m$$

where $m \in [-21, -7, 7, 21]$ and σ is a complex number that includes amplitude and phase offsets due to the effects of the channel and transmitter/receiver front-ends. Non-pilot index values of m contain data.

Some embodiments minimize the difference between these two channel measurements in order to calculate the offset, σ, and use that to improve the channel estimate and update the peak detector's output. An example is expressed in the following equation:

$$\min_\sigma \sum_m \left| \frac{P'_m}{\sigma P_m} - \frac{V_m}{|L_m|^2} \right|$$

where $m \in [-21, -7, 7, 21]$.

This minimization results in a value for the offset σ, which can then be used to modify $V_m$ at the 4 pilot locations. A weight, τ, can then be used to fuse the original measurement Vm with the modified version at the pilot locations as expressed in the following equation:

$$w = \tau V_m + \left[ \frac{(1-\tau)|L_m|^2 P'_m}{\sigma P_m} \right]$$

where $m \in [-21, -7, 7, 21]$. At non-pilot positions the weight, τ, is 1 so that the original $V_m$ values are retained. The weighted fused value (shown as Marker W in FIG. 17) then goes through an IFFT step 1794 and fed back to the peak detector 1765 through the modulus operator 1786. FIG. 17 shows the channels FFT coefficients are also stored in memory. This can be done by performing an FFT on the improved pilot channel estimate, or by doing an FFT on the long preamble correlator output.

B. Alternative Embodiment using RSSI

Figure 19:
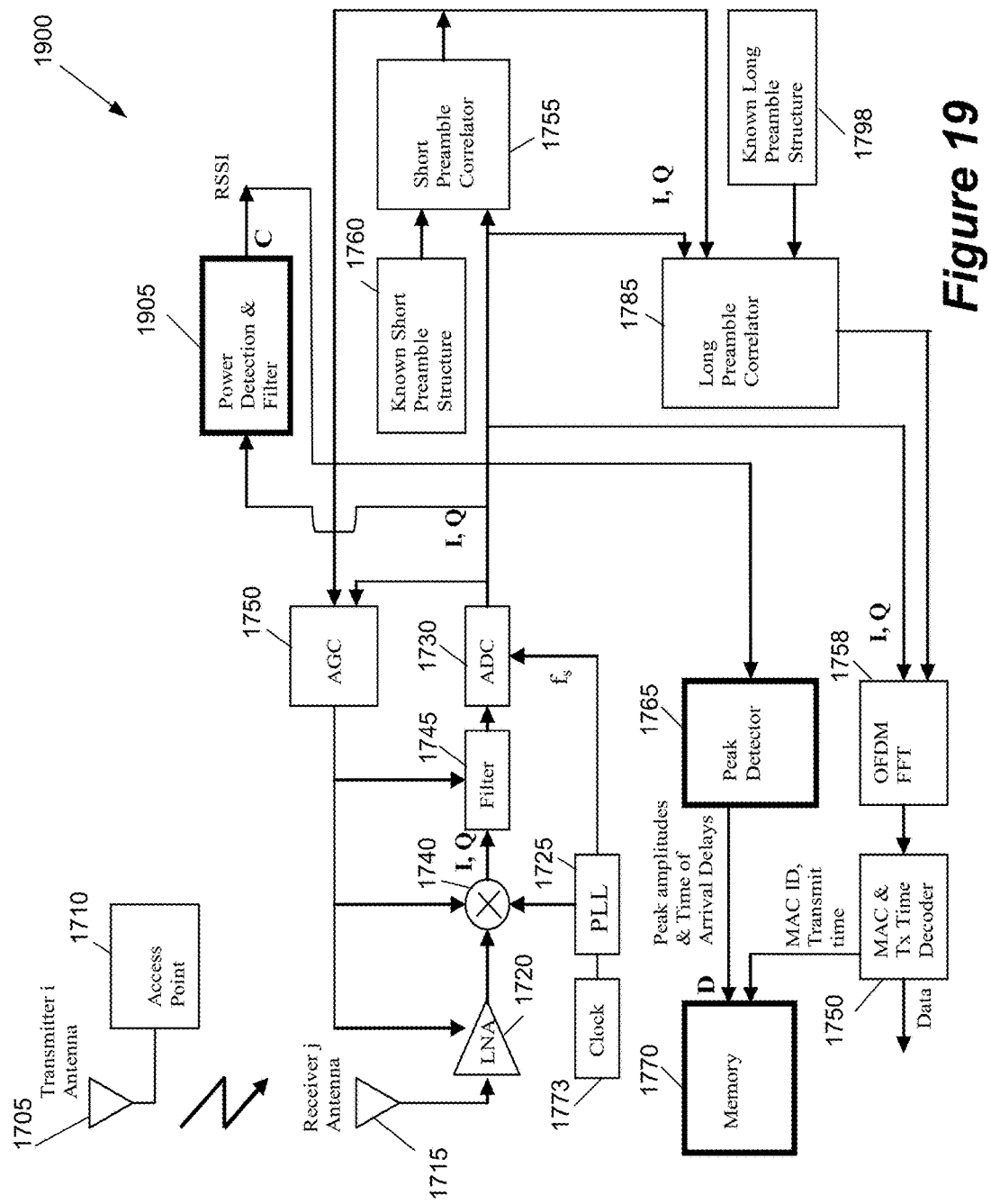
FIG. 19 conceptually illustrates a system of some embodiments that uses the Received Signal Strength Indication to determine the time delay between a transmitter base station and a mobile receiver.

Some embodiments (as described by reference to FIG. 17), measure time of arrival, where correlation with the known preamble transmitted structure is used. FIG. 19 illustrates an alternative embodiment that uses the time of arrival of the Received Signal Strength Indication (RSSI). One of ordinary skill in the art would realize that specific details of FIG. 19 are given as an example and it is possible to use different circuit implementations to achieve the same results without deviating from the teachings of the invention. Furthermore, the example of FIG. 19 uses the wireless LAN IEEE 802.11a standard to demonstrate methods of how to extract some of the channel's characteristics such as the time of arrival delay using RSSI transition in some embodiments. However, one of ordinary skill in the art would realize that the disclosed methods can be applied to any system that has a pre-amble structure such as Bluetooth®, GPS, WLAN, cellular (2G, 3G, 4G), WiMAX, HD Radio™, UWB, and 60 GHz standards. The proposed methodology works as long as both the transmitter and receiver use the same standard.

Figure 20:
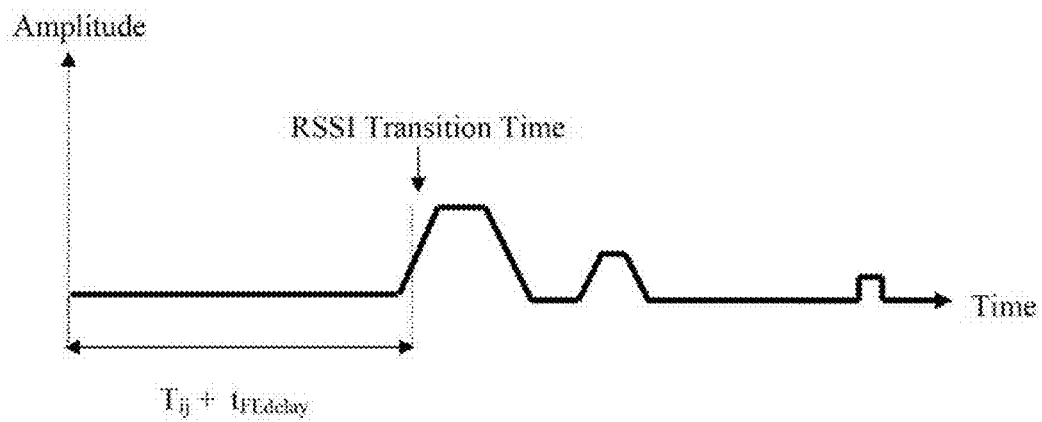
FIG. 20 illustrates an example of a Received Signal Strength Indication (RSSI) signal output of some embodiments.

FIG. 20 conceptually illustrates an example of an RSSI signal output of some embodiments. RSSI measures the power in the received RF signal. The power detection & filter module 1905 obtains the RSSI by squaring and summing the downcoverted in-phase (I) and quadrature (Q) signal components (see Markers I and Q in FIG. 19) and low pass filtering the results. When the receiver 1715 receives a signal similar to the signal shown in FIG. 16, the RSSI signal (see Marker C in FIG. 19) is zero until the first training symbol, $t_1$, arrives. The signal then increases in value and stays up until the last data packet and then it transitions back down to zero.

Some embodiments measure the time corresponding to the middle of the RSSI transition edge, when the signal spikes from a value close to zero to its high power level. This time represents the time of arrival of the first short preamble training symbol, $t_1$, in FIG. 16. Since the RSSI transition time is calculated in firmware (performed by power detection & filter 1905, peak detector 1765, and stored in memory 1770) it is possible to access it directly and use it instead of the preamble correlation peak delay.

The firmware also has its own clock for measuring time (same clock 1773 that feeds the PLL 1725 and the ADC 1730). Therefore, using the RSSI transition time instead of the preamble correlation method has the advantage that it does not require the hardware changes of register counters for time measurements, since the function of the counter will be emulated in firmware albeit at lower time resolution. However, the RSSI transition time is less accurate than the preamble correlation peak delay in noisy environments. Also, when the peaks are close together they would overlap. The short and long preamble correlator blocks are still needed in order to determine the start time for the OFDM FFT. Other components of FIG. 19 are similar to those described by reference to FIG. 17 above. One of ordinary skill in the art would realize that specific details of FIG. 19 are given as an example and it is possible to use different circuit implementations to achieve the same results without deviating from the teachings of the invention.

VII. Computer System

Many of the above-described processes and modules are implemented as software processes that are specified as a set of instructions recorded on a computer readable storage medium (also referred to as "computer readable medium" or "machine readable medium"). These instructions are executed by one or more computational elements, such as one or more processing units of one or more processors or other computational elements like Application-Specific ICs ("ASIC") and Field Programmable Gate Arrays ("FPGA"). The execution of these instructions causes the set of computational elements to perform the actions indicated in the instructions. Computer is meant in its broadest sense, and can include any electronic device with a processor (e.g., moving scanner, mobile device, access point, etc.). Examples of computer readable media include, but are not limited to, CD-ROMs, flash drives, RAM chips, hard drives, EPROMs, etc. The computer readable media does not include carrier waves and/or electronic signals passing wirelessly or over wired connection.

In this specification, the term "software" includes firmware residing in read-only memory or applications stored in magnetic storage that can be read into memory for processing by one or more processors. Also, in some embodiments, multiple software inventions can be implemented as parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computer systems define one or more specific machine implementations that execute and perform the operations of the software programs.

Figure 21:
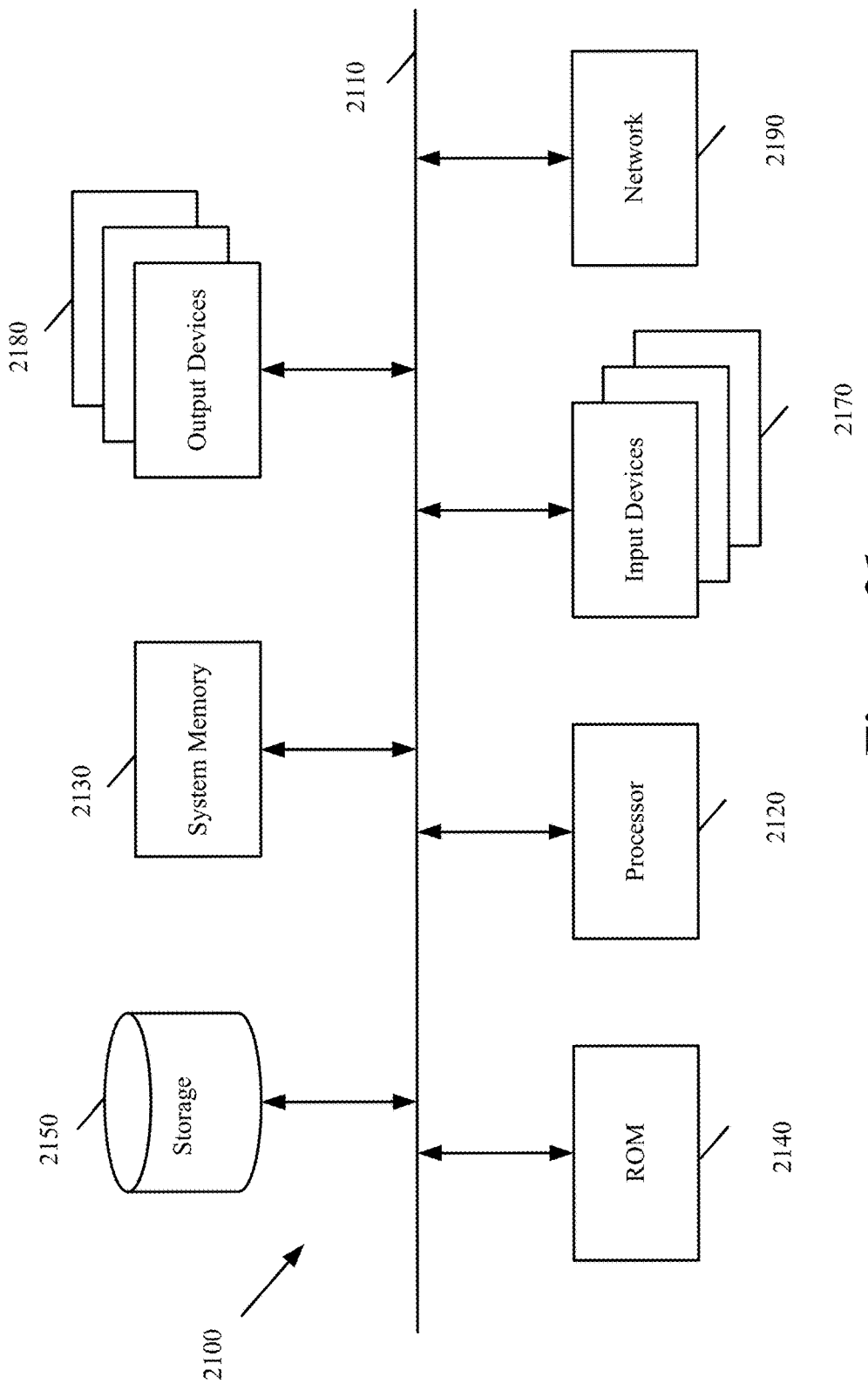
FIG. 21 illustrates a computer system with which some embodiments of the invention are implemented.

FIG. 21 conceptually illustrates a computer system 2100 with which some embodiments of the invention are implemented. For example, the moving scanner described above by reference to FIG. 4, the mobile device described above by reference to FIG. 8, or the access points described above by reference to FIG. 10 may be at least partially implemented using sets of instructions that are run on the computer system 2100. As another example, the processes described by reference to FIGS. 7, 9, 11, and 10 may be at least partially implemented using sets of instructions that are run on the computer system 2100.

Such a computer system includes various types of computer readable mediums and interfaces for various other types of computer readable mediums. Computer system 2100 includes a bus 2110, at least one processing unit (e.g., a processor) 2120, a system memory 2130, a read-only memory (ROM) 2140, a permanent storage device 2150, input devices 2170, output devices 2180, and a network connection 2190. The components of the computer system 2100 are electronic devices that automatically perform operations based on digital and/or analog input signals. The various examples of user inputs described by reference to FIGS. 7 and 10 may be at least partially implemented using sets of instructions that are run on the computer system 2100 and displayed using the output devices 2180.

One of ordinary skill in the art will recognize that the computer system 2100 may be embodied in other specific forms without deviating from the spirit of the invention. For instance, the computer system may be implemented using various specific devices either alone or in combination. For example, a local Personal Computer (PC) may include the input devices 2170 and output devices 2180, while a remote PC may include the other devices 2110-2150, with the local PC connected to the remote PC through a network that the local PC accesses through its network connection 2190 (where the remote PC is also connected to the network through a network connection).

The bus 2110 collectively represents all system, peripheral, and chipset buses that communicatively connect the numerous internal devices of the computer system 2100. In some cases, the bus 2110 may include wireless and/or optical communication pathways in addition to or in place of wired connections. For example, the input devices 2170 and/or output devices 2180 may be coupled to the system 2100 using a wireless local area network (W-LAN) connection, Bluetooth®, or some other wireless connection protocol or system.

The bus 2110 communicatively connects, for example, the processor 2120 with the system memory 2130, the ROM 2140, and the permanent storage device 2150. From these various memory units, the processor 2120 retrieves instructions to execute and data to process in order to execute the processes of some embodiments. In some embodiments the processor includes an FPGA, an ASIC, or various other electronic components for execution instructions.

The ROM 2140 stores static data and instructions that are needed by the processor 2120 and other modules of the computer system. The permanent storage device 2150, on the other hand, is a read-and-write memory device. This device is a non-volatile memory unit that stores instructions and data even when the computer system 2100 is off. Some embodiments of the invention use a mass-storage device (such as a magnetic or optical disk and its corresponding disk drive) as the permanent storage device 2150.

Other embodiments use a removable storage device (such as a floppy disk, flash drive, or CD-ROM) as the permanent storage device. Like the permanent storage device 2150, the system memory 2130 is a read-and-write memory device. However, unlike storage device 2150, the system memory 2130 is a volatile read-and-write memory, such as a random access memory (RAM). The system memory stores some of the instructions and data that the processor needs at runtime. In some embodiments, the sets of instructions and/or data used to implement the invention's processes are stored in the system memory 2130, the permanent storage device 2150, and/or the read-only memory 2140. For example, the various memory units include instructions for processing multimedia items in accordance with some embodiments.

The bus 2110 also connects to the input devices 2170 and output devices 2180. The input devices 2170 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 2180 include printers, electronic display devices that display still or moving images, and electronic audio devices that play audio generated by the computer system. For instance, these display devices may display a graphical user interface (GUI). The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 21, bus 2110 also couples computer 2100 to a network 2190 through a network adapter (not shown). In this manner, the computer can be a part of a network of computers (such as a local area network ("LAN"), a wide area network ("WAN"), an Intranet, or a network of networks, such as the Internet. For example, the computer 2100 may be coupled to a web server (network 2190) so that a web browser executing on the computer 2100 can interact with the web server as a user interacts with a GUI that operates in the web browser.

As mentioned above, some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by a device such as an electronics device, a microprocessor, a processor, a multi-processor (e.g., an IC with several processing units on it) and includes sets of instructions for performing various operations. The computer program excludes any wireless signals, wired download signals, and/or any other ephemeral signals.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "computer system", "server", "processor", and "memory" all refer to electronic or other technological devices. These terms exclude people or groups of people. For the purposes of this specification, the terms display or displaying mean displaying on an electronic device. As used in this specification and any claims of this application, the terms "computer readable medium", "computer readable media", "machine readable medium", and "machine readable media" are entirely restricted to non-transitory, tangible, physical objects that store information in a form that is readable by a computer. These terms exclude any wireless signals, wired download signals, and/or any other ephemeral signals.

It should be recognized by one of ordinary skill in the art that any or all of the components of computer system 2100 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. Moreover, while the examples shown illustrate many individual modules as separate blocks, one of ordinary skill in the art would recognize that some embodiments may combine these modules into a single functional block or element. One of ordinary skill in the art would also recognize that some embodiments may divide a particular module into multiple modules. Furthermore, specific details (such as details shown in FIGS. 4, 6, 17, 19, etc.) are given as an example and it is possible to use different circuit implementations to achieve the same results without deviating from the teachings of the invention.

One of ordinary skill in the art would understand that the invention is not to be limited by the foregoing illustrative details, but rather is to be defined by the appended claims.

What is claimed is:

1. A method of determining a location of a mobile device, the mobile device comprising a plurality of antennas, the method comprising:
   at each of the plurality of antennas of the mobile device, receiving a signal in a first plurality of signals from each of a plurality of antennas of a single transmitting device over a separate transmission channel in a plurality of transmission channels;
   generating a multichannel profile from a superposition of the first plurality of signals, the multichannel profile comprising a plurality of peaks, each peak in the plurality of peaks corresponding to a signal in the first plurality of signals received over a transmission channel in the plurality of transmission channels;
   computing a first plurality of parameters associated with the peaks of the multichannel profile;
   retrieving, from a database, a second plurality of parameters associated with a second plurality of signals previously received from the plurality of antennas of said transmitting device at a set of scanning devices;
   correlating the first plurality of parameters with the second plurality of parameters; and
   determining the location of the mobile device based on the correlation.

2. The method of claim 1, wherein determining the location of the mobile device comprises:
   determining a location of each of the plurality of the antennas of the mobile device; and
   determining the location of the mobile device as a weighted average of the location of each of the plurality of antennas of the mobile device.

3. The method of claim 1, wherein each parameter in the second plurality of parameters is associated with a location where a corresponding signal from the second plurality of signals was received, wherein each location associated with a parameter in the second set of parameters is identified by a set of coordinate values, the method further comprising:
   calculating a correlation coefficient corresponding to each particular location based on the first plurality of parameters and the second plurality of parameters that is associated with the particular location; and
   determining the location of the mobile device by computing a set of coordinate values for the location of each of the plurality of antennas of the mobile device, each coordinate value for the location of an antenna computed as a weighted average of each correlation coefficient multiplied by a coordinate value in the set of coordinate values corresponding to the second set of parameters.

4. The method of claim 3, wherein calculating the correlation coefficient corresponding to each particular location comprises:
multiplying each parameter in the first plurality of parameters with each parameter in the second plurality of parameters that is associated with the particular location;
summing a result of each multiplication to determine a correlation coefficient corresponding to the particular location; and
normalizing each correlation coefficient.

5. The method of claim 1, wherein the transmission channels are direct line of sight propagation channels.

6. The method of claim 5, wherein the set of scanning devices comprises a scanning device with a same antenna configuration as the mobile device.

7. The method of claim 1, wherein the second plurality of parameters comprise a plurality of peak time of arrivals associated with profiles of the second plurality of signals.

8. The method of claim 1, wherein the second plurality of parameters are associated with a plurality of peaks of a multichannel profile generated from a superposition of the second plurality of signals.

9. The method of claim 1, wherein none of the signals received at the mobile device from the transmitting device propagate in multipath.

10. The method of claim 1, wherein the profile of each signal in the first plurality of signals comprises only one peak time of arrival corresponding to one direct line of sight or one multipath signal, wherein the second plurality of parameters comprise a plurality of peak time of arrivals associated with profiles of the second plurality of signals.

11. The method of claim 1, wherein the first and second pluralities of parameters comprise a plurality of parameters characterizing the plurality of transmission channels, wherein the first and second pluralities of parameters comprise multichannel profiles and channel fast Fourier transform (FFT) coefficients.

12. The method of claim 1 further comprising receiving one or more multipath signals related to the first plurality of signals, wherein characterizing the profile of the received signals comprises computing a set of parameters for the multipath signals.

13. The method of claim 1, wherein the first plurality of signals comprises signals received from a plurality of transmitting devices comprising said transmitting device, wherein the plurality of transmitting devices transmit signals of different standards comprising at least two of Wireless Local Area Network (WLAN) 802.11, Bluetooth, WiMax, HD Radio, Ultra-wideband (UWB), GPS, cellular, and 60 GHz standards.

14. The method of claim 1, wherein each of the plurality of antennas of said single transmitting device transmits with an associated preset time delay in relation to other antennas, wherein each antenna of the mobile device receives signals from each particular antenna of said single transmitting device at a particular delay in relation to the signals received from the other antennas of said single transmitting device, each particular delay proportional to (i) a distance between the particular antenna and (ii) the preset time delay associated with the antenna.

15. The method of claim 1, wherein the plurality of antennas of the transmitting device transmit together without a preset time delay.

16. A non-transitory machine readable medium storing a program for determining a location of a mobile device comprising a plurality of antennas, the program executable by at least one processor, the program comprising sets of instructions for:
receiving, at each of the plurality of antennas of the mobile device, a signal in a first plurality of signals from each of a plurality of antennas of a single transmitting device over a separate transmission channel in a plurality of transmission channels;
generating a multichannel profile from a superposition of the first plurality of signals, the multichannel profile comprising a plurality of peaks, each peak in the plurality of peaks corresponding to a signal in the first plurality of signals received over a transmission channel in the plurality of transmission channels;
computing a first plurality of parameters associated with the peaks of the multichannel profile;
retrieving, from a database, a second plurality of parameters associated with a second plurality of signals previously received from the plurality of antennas of said transmitting device at a set of scanning devices;
correlating the first plurality of parameters with the second plurality of parameters; and
determining the location of the mobile device based on the correlation.

17. The non-transitory machine readable medium of claim 16, wherein the set of instructions for determining the location of the mobile device comprises sets of instructions for:
determining a location of each of the plurality of the antennas of the mobile device; and
determining the location of the mobile device as a weighted average of the location of each of the plurality of antennas of the mobile device.

18. The non-transitory machine readable medium of claim 16, wherein each parameter in the second plurality of parameters is associated with a location where a corresponding signal from the second plurality of signals was received, wherein each location associated with a parameter in the second set of parameters is identified by a set of coordinate values, the program further comprising sets of instructions for:
calculating a correlation coefficient corresponding to each particular location based on the first plurality of parameters and the second plurality of parameters that is associated with the particular location; and
determining the location of the mobile device by computing a set of coordinate values for the location of each of the plurality of antennas of the mobile device, each coordinate value for the location of an antenna computed as a weighted average of each correlation coefficient multiplied by a coordinate value in the set of coordinate values corresponding to the second set of parameters.

19. The non-transitory machine readable medium of claim 18, wherein the set of instructions for calculating the correlation coefficient corresponding to each particular location comprises sets of instructions for:
multiplying each parameter in the first plurality of parameters with each parameter in the second plurality of parameters that is associated with the particular location;
summing a result of each multiplication to determine a correlation coefficient corresponding to the particular location; and
normalizing each correlation coefficient.

20. The non-transitory machine readable medium of claim 16, wherein the transmission channels are direct line of sight propagation channels.

21. The non-transitory machine readable medium of claim 20, wherein the set of scanning devices comprises a scanning device with a same antenna configuration as the mobile device.

22. The non-transitory machine readable medium of claim 16, wherein the second plurality of parameters comprise a plurality of peak time of arrivals associated with profiles of the second plurality of signals.

23. The non-transitory machine readable medium of claim 16, wherein the second plurality of parameters are associated with a plurality of peaks of a multichannel profile generated from a superposition of the second plurality of signals.

24. The non-transitory machine readable medium of claim 16, wherein none of the signals received at the plurality of antennas of the mobile device from the transmitting device propagate in multipath.

25. The non-transitory machine readable medium of claim 16, wherein the profile of each signal in the first plurality of signals comprises only one peak time of arrival corresponding to one direct line of sight or one multipath signal, wherein the second plurality of parameters comprise a plurality of peak time of arrivals associated with profiles of the second plurality of signals.

26. The non-transitory machine readable medium of claim 16, wherein the first and second pluralities of parameters comprise a plurality of parameters characterizing the plurality of transmission channels, wherein the first and second pluralities of parameters comprise multichannel profiles and channel fast Fourier transform (FFT) coefficients.

27. The non-transitory machine readable medium of claim 16, the program further comprising a set of instructions for receiving one or more multipath signals related to the first plurality of signals, wherein the set of instructions for characterizing the profile of the received signals comprises a set of instructions for computing a set of parameters for the multipath signals.

28. The non-transitory machine readable medium of claim 16, wherein the first plurality of signals comprises signals received from a plurality of transmitting devices comprising said transmitting device, wherein the plurality of transmitting devices transmit signals of different standards comprising at least two of Wireless Local Area Network (WLAN) 802.11, Bluetooth, WiMax, HD Radio, Ultra-wideband (UWB), GPS, cellular, and 60 GHz standards.

29. The non-transitory machine readable medium of claim 16, wherein each of the plurality of antennas of said single transmitting device transmits with an associated preset time delay in relation to other antennas, wherein each antenna of the mobile device receives signals from each particular antenna of said single transmitting device at a particular delay in relation to the signals received from the other antennas of said single transmitting device, each particular delay proportional to (i) a distance between the particular antenna and (ii) the preset time delay associated with the antenna.

30. The non-transitory machine readable medium of claim 16, wherein the plurality of antennas of the transmitting device transmit together without a preset time delay.

* * * * *